United States Patent
Blakesley et al.

(10) Patent No.: US 12,462,230 B2
(45) Date of Patent: Nov. 4, 2025

(54) TECHNIQUE FOR PROVIDING OPTIMIZED DIGITAL INFORMATION

(71) Applicant: Apple Inc., Cupertino, CA (US)

(72) Inventors: Scott D. Blakesley, San Jose, CA (US); Akila Suresh, San Jose, CA (US); Brian D. Jett, San Francisco, CA (US); David T. Haggerty, San Francisco, CA (US); Richard W. Heard, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 741 days.

(21) Appl. No.: 17/209,079

(22) Filed: Mar. 22, 2021

(65) Prior Publication Data

US 2021/0295280 A1 Sep. 23, 2021

Related U.S. Application Data

(60) Provisional application No. 62/993,469, filed on Mar. 23, 2020.

(51) Int. Cl.
*G06Q 20/04* (2012.01)
*G06Q 20/36* (2012.01)
(Continued)

(52) U.S. Cl.
CPC ......... *G06Q 20/047* (2020.05); *H04L 9/3213* (2013.01); *G06Q 20/363* (2013.01);
(Continued)

(58) Field of Classification Search
CPC .............. G06Q 20/047; G06Q 20/363; G06Q 20/3674; H04L 9/3213; H04L 9/3247
(Continued)

(56) References Cited

U.S. PATENT DOCUMENTS

2009/0249448 A1* 10/2009 Choi ....................... H04L 67/14
726/4
2016/0307196 A1* 10/2016 Achhra .............. G06Q 20/3821
(Continued)

FOREIGN PATENT DOCUMENTS

WO WO-2013166507 A1 * 11/2013 ........... G06Q 20/027

*Primary Examiner* — John W Hayes
*Assistant Examiner* — Wodajo Getachew
(74) *Attorney, Agent, or Firm* — Kilpatrick Townsend & Stockton LLP

(57) ABSTRACT

Techniques for providing optimized digital information including receiving a request for authorization to access a subset of order information that corresponds to a transaction. A account server can generate a first authorization token based at least in part on the request for authorization. The account server can transmit at least the first authorization token to the application of the user device. The account server can receive a verification request comprising a second authorization token. The account server can verify whether the first authorization token matches the second authorization token. In accordance with a determination that the first authorization token matches the second authorization token, the account server can transmit, to the service provider, a verification response that instructs the service provider to provide the subset of the order information that corresponds to the transaction to the application of the user device.

20 Claims, 10 Drawing Sheets

(51) Int. Cl.
  G06Q 20/38    (2012.01)
  H04L 9/32     (2006.01)
  H04L 9/40     (2022.01)

(52) U.S. Cl.
  CPC ..... *G06Q 20/3674* (2013.01); *G06Q 20/3821* (2013.01); *G06Q 20/385* (2013.01); *H04L 9/3234* (2013.01); *H04L 9/3247* (2013.01); *H04L 63/0807* (2013.01)

(58) Field of Classification Search
  USPC .......................................................... 705/77
  See application file for complete search history.

(56) References Cited

U.S. PATENT DOCUMENTS

| | | | |
|---|---|---|---|
| 2017/0099280 A1* | 4/2017 | Goel | H04L 67/146 |
| 2018/0150832 A1* | 5/2018 | Badal-Badalian | G06Q 20/3276 |
| 2019/0114637 A1* | 4/2019 | Rome | H04L 67/535 |
| 2020/0034802 A1* | 1/2020 | Chopra | G06Q 20/047 |
| 2020/0313878 A1* | 10/2020 | Wang | G06F 16/1734 |
| 2020/0389317 A1* | 12/2020 | Dunjic | G06F 3/00 |
| 2021/0075793 A1* | 3/2021 | Dunjic | H04L 63/0884 |
| 2021/0135874 A1* | 5/2021 | Varvarezis | H04W 12/08 |

\* cited by examiner

TECHNIQUE FOR PROVIDING OPTIMIZED DIGITAL INFORMATION

CROSS-REFERENCE TO RELATED APPLICATION

This application claims priority to U.S. Provisional Application Ser. No. 62/993,469 filed Mar. 23, 2020 entitled, "Technique for Providing Optimized Digital Receipts," which is incorporated herein by reference in its entirety.

BACKGROUND

Mobile devices and their applications have become so ubiquitous and useful, that people tend to utilize them for everyday activities, including managing information about digital items. As the number of items that a mobile device can access and/or manage increase, the amount of information about these items will increase. However, due to privacy and security concerns, there are challenges with accessing this information.

BRIEF DESCRIPTION OF THE DRAWINGS

Various embodiments in accordance with the present disclosure will be described with reference to the drawings, in which.

DETAILED DESCRIPTION

Figure 1:
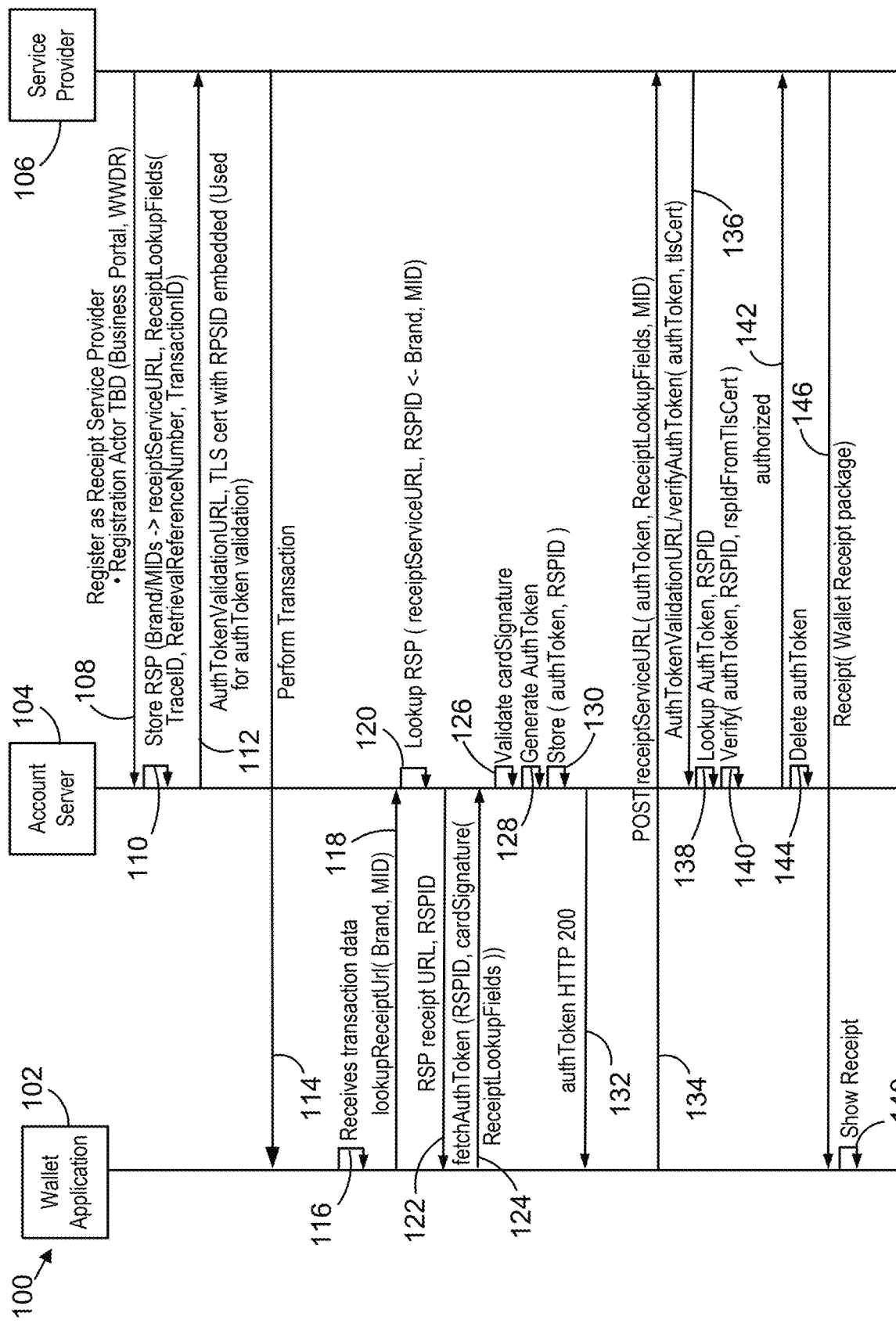
FIG. 1 illustrates an example sequence diagram for illustrating example techniques for providing optimized digital information, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, an account server may be configured to facilitate optimized digital receipts to be provided to an application of a user device. For example, the user device (e.g., a smart phone or other handheld and/or portable device) may have installed thereon a wallet application configured to manage and present digital receipts (e.g., via a user interface (UI)). The digital receipts may correspond to transactions made by the user device or associated with an account that corresponds to the user device. The transactions may be between the user device and one or more merchants (e.g., brick-and-mortar, electronic marketplaces, services providers, etc.). The optimized digital receipts may include additional information that is only available from a particular service provider (e.g., a receipt service provider and/or a merchant). This additional information may be private information that the user of the mobile device does not want to be shared, leaked, or intentionally provided to any other services or devices, including the account server itself. For example, even though the account server may be a first-party server that manages the account of owner of the user device (and, thus is associated with the wallet application) and/or is already aware of the transaction (and, may have even facilitated the transaction), the owner of the account may not want the account server to have any access to the optimized digital receipt or any portion of the receipt at all.

In some examples, without the optimized digital receipt information, the user of the wallet application would only be able to see limited information about, that is, only the information that the account server does know about the transaction (e.g., the total price, merchant name, and date). For example, the account server may be access only a portion of the information (such as a portion for which privacy is not a concern) associated with the transaction, where the wallet application may only be able to display the portion of the information retrieved from the account server on the UI for the user. However, the optimized digital receipts (e.g., order information that corresponds to a transaction) can be presented in a UI of the user device, for example, in the wallet application. The wallet application may be secured from other applications of the user device, thus the optimized digital receipt can only be presented on a screen to the user (e.g., owner) of the user device, and is maintained securely. The order information of the optimized digital receipts may include transaction information such as time, date, itemized information (e.g., subtotals, tax, tip, other service charges, etc.), as well as other information about the transaction including item information (e.g., a type, a title, an image (e.g., cover image art), associated people (e.g., actors, musicians, directors, producers, etc.)) and/or merchant information (e.g., merchant name, merchant address, images of the merchant, etc.).

In some examples, the optimized digital receipt information is kept private by not having the information be accessible or sent to the account server. However, the account server needs to be able to make sure that the request for the information is coming from a valid mobile device (e.g., associated with the account that corresponds to the transaction) and that the receipt information is formatted properly so that it can be presented in the UI of the wallet application according to the design specifications of the wallet application. Thus, the account server may act a token generator/provider/validator. In this way, the account server can provide authorization tokens to the wallet application. The wallet application can then make requests to the receipt service provider (e.g., merchant) for the receipt information using the authorization token. The receipt service provider can then have the account server validate the authorization token from the wallet application, and if the token is validated (e.g., it came from the correct and authorized account), the service provider can then transmit the optimized receipt information directly to the wallet application without the private information ever being accessible or sent to the account server.

Thus, the wallet application can request the optimized receipt information from the merchant, but can only be sent the information after the request (e.g., from the wallet application to the receipt service provider) is authorized by the account server. As noted, the account server may be operated/managed by a service provider that manages the user account. So, the account server is able to determine whether the user account associated with the wallet application is the appropriate user account to be making requests for such information. In some examples, having the account server be the entity that verifies the authorization token for the receipt request enables excluding certain merchants (e.g., service providers) from participating in this optimized digital receipt process. For example, if a merchant is determined to be fraudulent or a bad actor or any kind, the account server can detect requests from that merchant, and not validate the authorization token even if the token is valid (e.g., even if it matches the authorization token that was provided to the wallet application for requesting a particular receipt from that merchant). In other words, the account server is able to verify a) that receipt requests are coming from valid user accounts associated with the wallet application, b) that receipt information is requested to be sent to valid user accounts associated with the wallet application and/or the appropriate user accounts (e.g., not the wrong user account), and c) that each merchant is trusted and/or registered prior to sending information to any given wallet application.

For the sake of clarity, the service provider described herein could be a merchant (e.g., a merchant acquirer), a payment service provider (PSP), or a point of sale provider (POS provider), all of which are payment facilitators. Additionally, as described herein an account server may be a first-party server that facilitates the management of user account information corresponding to various respective user accounts (e.g., different user accounts corresponding to a wallet application or family-based user accounts that have access a user account corresponding to a wallet application). A third-party computer may be any Web service or other server computer associated with a third-party for processing transactions and/or payments. In some instances, the account server described herein can be a first party payment server that facilitates management of user account information associated with a wallet application and payment devices (e.g., personal credit cards, bank cards, gift cards, etc.). A receipt service provider can be either a first-party merchant or a third-party merchant. A card issuer can be any first-party or third-party credit card company for processing actual payment transactions (e.g., when a user purchases something, and money needs to be exchanged from one account to another for completion of the transaction).

FIG. 1 illustrates an example sequence diagram 100 for illustrating example techniques for providing optimized digital receipts, according to at least one embodiment. The sequence diagram 100 illustrates communications and operations among a plurality of entities associated with a transaction.

The entities of diagram 100 includes a wallet application 102 in the illustrated embodiment. The wallet application 102 may comprise a software application that operates on a device (such as a smartphone, a mobile device, or another computer device). The wallet application 102 may manage one or more user accounts associated device and may facilitate purchases of goods or services, or other monetary transactions, corresponding to the one or more user accounts. For example, the wallet application 102 may receive and/or store payment information (such as bank account numbers, information associated with the bank account numbers, credit card numbers, information associated with the credit card numbers, bank card numbers, information associated with the bank card numbers, gift cards, and/or other types of payment methods and information associated with the other types of payment methods) associated with the one or more accounts.

The wallet application 102 may interact with one or more applications and/or devices to facilitate purchases or other payments using the payment information. For example, the wallet application 102 may interact with another application on the device that facilitates purchase of goods or services, provide connection to a web resource that facilitates purchase of goods or services, and/or other monetary transactions. Further, the wallet application 102 may interact with separate devices (such as via short range wireless communication, magnetic strip communication, or chip communication) that facilitate purchase of goods or services, and/or other monetary transactions.

The entities of the diagram 100 further includes an account server 104 in the illustrated embodiment. The account server 104 may be related to the wallet application 102 and may maintain user accounts related with the wallet application 102. For example, the wallet application 102 may be installed on multiple devices having multiple different user accounts, where the account server 104 maintains the user accounts for wallet application 102 on each of the devices. The user accounts may include different user accounts corresponding to the wallet application 102 and/or family-based user accounts that have access to a user account corresponding to the wallet application 102. In some embodiments, the account server may further manage, or facilitate management of, user account information associated with payment devices (for example, personal credit cards, bank cards, gift cards, or other payment methods). The account server 104 may be located separate from the device on which the wallet application 102. In some embodiments, the account server 104 may be a first-party server that maintains the user accounts.

Maintaining user accounts by the account server 104 may include maintaining data related to the user accounts associated with the wallet application 102. In some embodiments, the data maintained by the account server 104 may avoid private data, such as data related to personal credit cards, bank cards, gift cards, other payment methods, and/or transaction data. The account server 104 may maintain data that facilitates access to the user accounts by a user (such as users of the wallet application 102), such as user names and passwords that allow access to the user accounts. In some embodiments, the account server 104 may further maintain data related to service providers (such as a service provider 106) that may interact with the wallet application 102.

The entities of the diagram 100 further includes a service provider 106 (which may be referred to as a receipt service provider (RSP)) in the illustrated embodiments. The service provider 106 may be a device operated by a payment facilitator that may store information related to transactions of the wallet application 102. For example, the service provider 106 may be operated by a merchant, a payment service provider (PSP), a point of sale (POS) provider, or other operator that has access to data related to transactions of the wallet application 102, where the data may include information that can be displayed in an optimized digital receipt for a transaction. The information to be displayed in the optimized digital receipt may include a subset of order information that corresponds to the transaction. The service provider 106 may generate and/or store information related to a transaction between the wallet application 102 and the service provider 106 or an entity served by the service provider 106.

The information generated and/or stored by the service provider 106 may include additional information related to the transaction that is not accessible by the account server 104. For example, the information generated and/or stored by the service provider 106 may include subtotals, tax amount, tip amount, service charges, item information (type, title, image), associated people (actors, musicians, directors, producers, or other people associated with the transaction, goods, and/or services), merchant information (merchant name, merchant address, images of a merchant, and/or other information related to a merchant) that may not be accessible to the account server 104. In some instances, the additional information generated and/or stored by the service provider 106 may be defined as being private, where the private information is to be accessible only to a user account associated with the wallet application 102, the service provider 106, and/or the merchant, and is to be inaccessible to other entities, such as the account server 104. Having the information being private may protect desired privacy of the individual.

The diagram 100 illustrates a plurality of operations among the wallet application 102, the account server 104, and service provider 106 related to a transaction of the wallet application 102 and presentation of an optimized digital receipt by the wallet application 102.

In operation 108, the service provider 106 may register with the account server 104. For example, the service provider 106 may transmit a registration request to the account server 104 requesting that the account server 104 register the service provider 106 as an entity that can provide receipt information to the wallet application 102. In some instances, the service provider 106 may be registering as a merchant from which a user of the wallet application 102 can purchase goods and/or services. Further, the service provider 106 may be registering as transaction service provider for one or more merchants, where the transaction service provider may generate and/or store information related to transactions for the one or more merchants.

The registration request may include information that uniquely identifies the service provider 106, where the account server 104 may identify the service provider 106 based on the information and determine whether to register the service provider 106. For example, the account server 104 may determine whether the service provider 106 is a reliable service provider or a bad actor based on the information, and may determine whether to register the service provider 106 (such as when the service provider 106 is determined to be a reliable service provider) or to prevent the service provider 106 from registering (such as when the service provider 106 is determined to be a bad actor. This may provide security to users of the wallet application 102 to prevent bad actors from interacting with the wallet application 102. In some embodiments, the account server 104 may allow the service provider 106 to register without determining whether the service provider is a reliable service provider or a bad actor. In some embodiments, the information transmitted by the service provider 106 in the registration request may include a business portal related to the service provider, a worldwide developer relations certificate (WWDR), a brand identifier (ID), a merchant ID (MID), a receipt service uniform resource locator (URL) (from which receipt information may be retrieved from the service provider 106), receipt lookup fields (such as a trace ID, a retrieval reference number, and/or a transaction ID), or some combination thereof.

In operation 110, the account server 104 may generate and/or store information related to the service provider 106 based on the registration request received in 108. For example, the account server 104 may store the information received in the registration request of operation 108. In embodiments where the registration request does not include a brand ID and/or a MID, the account server 104 may assign and store a brand ID and/or a MID to the service provider 106.

In operation 112, the account server 104 may provide the service provider 106 with information for validating an authorization token. For example, the account server 104 may provide the service provider 106 with information to interact with the account server 104 to verify an authorization token received by the service provider 106 received from the wallet application 102, as described further later in relation to the diagram 100. The information for validating the authorization provided by the account server 104 may include an authorization token validation URL (from which the service provider 106 may contact the account server 104 for validation), a transport layer security (TLS) certificate with service provider ID (RPSID) embedded, or some combination thereof.

In operation 114, a transaction may be performed between the wallet application 102 and the service provider 106. For example, the transaction performed in operation 114 may include a user using the wallet application 102 to purchase a good or service with the service provider 106. In some embodiments, the purchase may be made by touching a device on which the wallet application 102 is operating against a device associated with the service provider 106, purchasing the good or service associated with the service provider 106 through another application on the device with the wallet application 102 using the wallet application 102, a recurring payment scheduled in the wallet application 102 with the service provider 106, or another purchase method for purchasing goods or services from a service provider 106 using a computer device with a wallet application 102. In response to the purchase of the good or the service, the service provider 106 may provide the wallet application 102 with information to retrieve data for producing an optimized digital receipt associated with the transaction. For example, the service provider 106 may provide the wallet application 102 with receipt lookup fields to the wallet application 102. While operation 114 is shown after operation 112 in the illustrated embodiment, it should be understood that time may pass between operation 114 and operation 112 and other operations may occur between operation 114 and operation 112.

In operation 116, the wallet application 102 may receive transaction data from the service provider 106. For example, the wallet application 102 may receive and store the information to retrieve data for producing the optimized digital receipt associated with the transaction provided by the service provider in operation 114. Further, the wallet application 102 may receive and store information for identifying the service provider 106 (such as a brand ID, a MID, or some combination thereof) from the service provider 106.

In operation 118, the wallet application 102 may provide a lookup receipt URL request to the account server 104. For example, the wallet application 102 may transmit a lookup receipt URL request to the account server 104 that requests a service provider URL associated with the service provider 106 from which the wallet application 102 may retrieve an optimized digital receipt, or a subset of order information that corresponds to a transaction to be included in the optimized digital receipt. The lookup receipt URL request may include information for identifying the service provider, such as a brand ID, a MID, or some combination thereof.

In operation 120, the account server 104 may look up information that may be utilized by the wallet application 102 for retrieving an optimized digital receipt, or a subset of order information that corresponds to a transaction to be included in an optimized digital receipt, from the service provider 106. For example, the account server 104 may utilize the information for identifying the service provider received in operation 118 to identify a service provider URL (which may be referred to as a "receiptServiceURL" or a "RSP receipt URL") and/or a service provider ID that may be utilized by the wallet application for retrieving an optimized digital receipt, or a subset of order information that corresponds to a transaction to be included in an optimized digital receipt, from the service provider 106.

In some embodiments, the account server 104 may further determine whether the service provider 106 indicated by the information identifying the service provider 106 received in operation 118 has been registered with the account server 104 or is a bad actor. In situations where the account server 104 determines that the service provider 106 has not been registered with the account server 104 or is a bad actor, the account server 104 may terminate the operations of the diagram 100 at the operation 120. In some of these embodiments, the account server 104 may provide an indication to the wallet application 102 that the service provider 106 with which the wallet application 102 is trying to complete the transaction with is not supported by the account server 104. In some of these situations where the service provider 106 is not supported by the account server 104, the wallet application 102 may be limited to display of a receipt that has not been optimized and, therefore, may not include at least some of the information associated with the transaction, such as time, date, itemized information, other information about the transaction including item information, associated people, and/or merchant information that would be included in an optimized digital receipt. In instances where account server 104 determines that the service provider 106 with which the wallet application 102 is attempting to complete a transaction is a bad actor, the account server 104 may provide notification to the wallet application 102 that the service provider 106 is a bad actor, provide notification to payment method provider (such as a card issuer) that the service provider 106 is a bad actor, cause a transfer of funds from the wallet application 102 (or a fund account associated with the wallet application 102) to the service provider 106 to be terminated prior to transferring the funds in the transaction, or some combination thereof. Accordingly, determining whether the service provider 106 is a bad actor may provide security against a user of the wallet application 102 being scammed. In other embodiments, the account server 104 may not perform the determination whether the service provider 106 has been registered with the account server 104 or is a bad actor in 120.

In operation 122, the account server 104 may provide information that may be utilized by the wallet application 102 to retrieve an optimized digital receipt, or a subset of order information that corresponds to a transaction to be included in an optimized digital receipt, from the service provider 106. For example, the account server 104 may provide a service provider receipt URL and/or a service provider ID to the wallet application, which the wallet application 102 may utilize to retrieve an optimized digital receipt, or a subset of order information that corresponds to a transaction to be included in an optimized digital receipt, from the service provider 106.

In operation 124, the wallet application 102 may provide a request for an authorization token (which may be referred to as "fetchAuthToken") to the account server 104. For example, the wallet application 102 may transmit a request for an authorization token to the account server 104, where the authorization token is to be utilized by the wallet application 102 and the service provider 106 for determining whether the wallet application 102 is authorized to access an optimized digital receipt, or information for an optimized digital receipt, from the service provider 106. The request for authorization token by the wallet application 102 may include information to identify the service provider 106, information to verify a user or user account of the wallet application, information to identify the optimized digital receipt, or a subset of order information that corresponds to a transaction to be included in the optimized digital receipt, that the wallet application 102 will be attempting to retrieve from the service provider 106, or some combination thereof. The information included in the request for authorization token may include a service provider ID, a card signature, receipt lookup fields, or some combination thereof.

In operation 126, the account server 104 may validate the card signature received from the wallet application 102 received in operation 124. For example, the account server 104 may compare the card signature with a known card signature for a user account of the wallet application 102 that will be attempting to retrieve the optimized digital receipt, or a subset of order information that corresponds to a transaction to be included in the optimized digital receipt. In response to determining that the card signature received from the wallet application 102 is not validated against the known card signature, the account server 104 may terminate the operations of the diagram 100 at operation 126. Based on the card signature received from the wallet application 102 being validated against the known card signature, the operations of the diagram 100 may continue.

In operation 128, the account server 104 may generate an authorization token (which may be referred to as "AuthToken") in response to the request for the authorization token. For example, the account server 104 may generate an authorization token based on the card signature being validated against the known card signature. The authorization token may be utilized by the wallet application 102 and the service provider 106 to verify that a user account associated with the wallet application 102 is authorized to retrieve an optimized digital receipt, or a subset of order information that corresponds to a transaction to be included in an optimized digital receipt, from the service provider 106.

In operation 130, the account server 104 may store information for determining whether a user account associated with the wallet application 102 is authorized to retrieve an optimized digital receipt, or a subset of order information that corresponds to a transaction to be included in an optimized digital receipt, from the service provider. For example, the information stored by the account server 104 may include the authorization token and/or a service provider ID. In some embodiments, the account server 104 may be configured to store the information for determining for a set period of time (which may be referred to as a time to live (TTL), after which the account server 104 may delete the information. For example, the account server 104 may store the authorization token and/or the service provider ID for a set period of 15 minutes in some embodiments. Once the set period of time has expired and the information has been deleted, the account server 104 will no longer authorize the user account of the wallet application 102 to access the optimized digital receipt, or the subset of order information that corresponds to a transaction to be included in the optimized digital receipt, as the information has been deleted. Accordingly, the wallet application 102 has the set period of time to initiate an authorization request to account server 104 to be authorized for access to the optimized digital receipt, or the subset of order information that corresponds to a transaction to be included in the optimized digital receipt, or the authorization request will be denied by the account server 104.

In operation 132, the account server 104 may provide information to the wallet application 102 to be utilized to determine whether the wallet application 102 is authorized to access the optimized digital receipt, or the subset of order information that corresponds to a transaction to be included in the optimized digital receipt. For example, the account server 104 may transmit the authorization token to the wallet application 102, where the authorization token may be utilized to determine whether the wallet application 102 is authorized to access the optimized digital receipt, or the subset of order information that corresponds to a transaction to be included in the optimized digital receipt, from the service provider.

In operation 134, the wallet application 102 may request an optimized digital receipt from the service provider 106. For example, the wallet application 102 may utilize the service provider URL received in 122 to transmit a request for an optimized digital receipt from the service provider 106, which requests an optimized digital receipt, or a subset of order information that corresponds to a transaction to be included in an optimized digital receipt from the service provider 106. The request for optimized digital receipt may include information for determining authorization for the user account associated with the wallet application 102 to access the optimized digital receipt, or the subset of order information that corresponds to a transaction to be included in the optimized digital receipt, and/or information for identifying the optimized digital receipt, or the subset of order information that corresponds to a transaction to be included in the optimized digital. For example, the request for optimized digital receipt may include the authorization token (or copy thereof) to be utilized for determining whether the user account associated with the wallet application 102 is allowed to access the optimized digital receipt, or a subset of order information that corresponds to a transaction to be included in the optimized digital receipt. The request for optimized digital receipt may further include receipt lookup fields and/or an MID for identifying the optimized digital receipt, or a subset of order information that corresponds to a transaction to be included in the optimized digital receipt, that the wallet application 102 is requesting.

In operation 136, the service provider 106 may request authorization determination of the wallet application 102 from the account server 104. For example, the service provider 106 may transmit a request to the account server 104 to authorize the user account of the wallet application 102 to determine whether the user account is to be allowed to access the optimized digital receipt, or a subset of order information that corresponds to a transaction to be included in the optimized digital receipt. The request may be transmitted via the authorization token validation URL provided to the service provider 106 in operation 112. The request for authorization may include the authorization token (or copy thereof) received by the service provider 106 in operation 134 and/or the TLS certificate received by the service provider in operation 112.

In operation 138, the account server 104 may look up information for authorizing the wallet application 102. For example, the account server 104 may access stored information to determine whether the wallet application 102 is authorized to access the optimized digital receipt, or the a subset of order information that corresponds to a transaction to be included in the optimized digital receipt. The stored information accessed by account server 104 may include the authorization token and/or the service provider ID stored in operation 130.

In operation 140, the account server 104 may verify the authorization of the wallet application 102 to access the optimized digital receipt from the service provider 106. For example, the account server 104 may utilize the stored information accessed in operation 138 for authorization of a user account associated with the wallet application 102 to determine whether the user account is authorized to access the optimized digital receipt, or a subset of order information that corresponds to a transaction to be included in the optimized digital receipt, from the service provider 106. The account server 104 may compare the authorization token retrieved from storage in operation 138 with the authorization token received in the request for authorization in operation 136 to determine whether the authorization token from operation 138 is equal to the authorization token from operation 136. Further, the account server 104 may compare the service provider ID retrieved from storage in operation 138 with a service provider ID taken from the TLS certificate received in operation 134 to verify that the user account associated with the wallet application 102. Based on whether the authorization token from operation 138 is equal to the authorization token from operation 136, and/or whether the service provider ID from operation 138 is equal to the service provider ID from operation 134, the account server 104 may determine user account associated with the wallet application 102 is authorized to access the optimized digital receipt, or a subset of order information that corresponds to a transaction to be included in the optimized digital receipt, on the service provider 106. For example, the account server 104 may determine that the user account associated with the wallet application 102 is authorized to access the optimized digital receipt, or the subset of order information that corresponds to a transaction to be included in the optimized digital receipt, when the authorization token from operation 138 is equal to the authorization token from operation 136 and the service provider ID from operation 138 is equal to the service provider ID from operation 134 in some embodiments. The account server 104 may determine that the user account associated with the wallet application 102 is not authorized to access the optimized digital receipt, or the subset of order information that corresponds to a transaction to be included in the optimized digital receipt, if the authorization token from operation 138 is not equal to the authorization token from operation 136 or the service provider ID from operation 138 is not equal to the service provider ID from operation 134 in these embodiments.

In operation 142, the account server 104 may provide an indication to the service provider 106 whether the wallet application 102 is authorized to access the optimized digital receipt on service provider 106. For example, the account server 104 may transmit an indication of whether the user account associated with the wallet application 102 was determined to be authorized to access the optimized digital receipt, or the subset of order information that corresponds to a transaction to be included in the optimized digital receipt in operation 140. If the account server 104 determined that the user account is not authorized in operation 140, the operations of the diagram 100 may terminate after 142. If the account server 104 determined that the user account is authorized in operation 140, the operations of the diagram 100 may continue.

In operation 144, the account server 104 may delete the stored authorization token. For example, the account server 104 may delete the stored authorization token based on the account server 104 determining that the user account associated with the wallet application 102 is authorized in operation 140 and the indication being transmitted in operation 142.

In operation 146, the service provider 106 may provide the optimized digital receipt to the wallet application 102. For example, the service provider 106 may provide the optimized digital receipt, or the subset of order information that corresponds to a transaction to be included in the optimized digital receipt (which may be referred to as the "wallet receipt package"), to the wallet application 102 based on the indication received in operation 142 indicating that user account associated with the wallet application 102 is authorized to access the optimized digital receipt, or the subset of order information that corresponds to a transaction to be included in the optimized digital receipt. The optimized digital receipt, or the subset of order information that corresponds to a transaction to be included in the optimized digital receipt, may include subtotals, tax amount, tip amount, service charges, item information (type, title, image), associated people (actors, musicians, directors, producers, or other people associated with the transaction, goods, and/or services), merchant information (merchant name, merchant address, images of a merchant, and/or other information related to a merchant) that may not be accessible to the account server 104. The service provider 106 may directly provide the optimized digital receipt, or the subset of order information that corresponds to a transaction to be included in the optimized digital receipt, directly to the wallet application 102, thereby keeping the account server 104 from having access to the optimized digital receipt, or the subset of order information that corresponds to a transaction to be included in the optimized digital receipt, and protecting the privacy of the user of the wallet application 102 for the transaction.

In operation 148, the wallet application 102 may display the optimized digital receipt on a user interface (UI) of the device on which the wallet application 102 operates. For example, the wallet application 102 may display the optimized digital receipt received from the service provider 106 in operation 146 in some embodiments. In other embodiments where the wallet application 102 receives a subset of order information that corresponds to a transaction to be included in an optimized digital receipt in operation 146, the wallet application 102 may generate an optimized digital receipt with the information and display the generated optimized digital receipt.

While the operations of the diagram 100 are described as being performed once, it should be understood that one or more of the operations may be performed multiple times. For example, the wallet application 102 may request the optimized digital receipt, or a subset of order information that corresponds to a transaction to be included in the optimized digital receipt, multiple times, which may cause operations 134 through 148 to be performed multiple times. Additionally, it should be understood that two or more of the operations of the diagram 100 may be performed concurrently in some embodiments.

Figure 2:
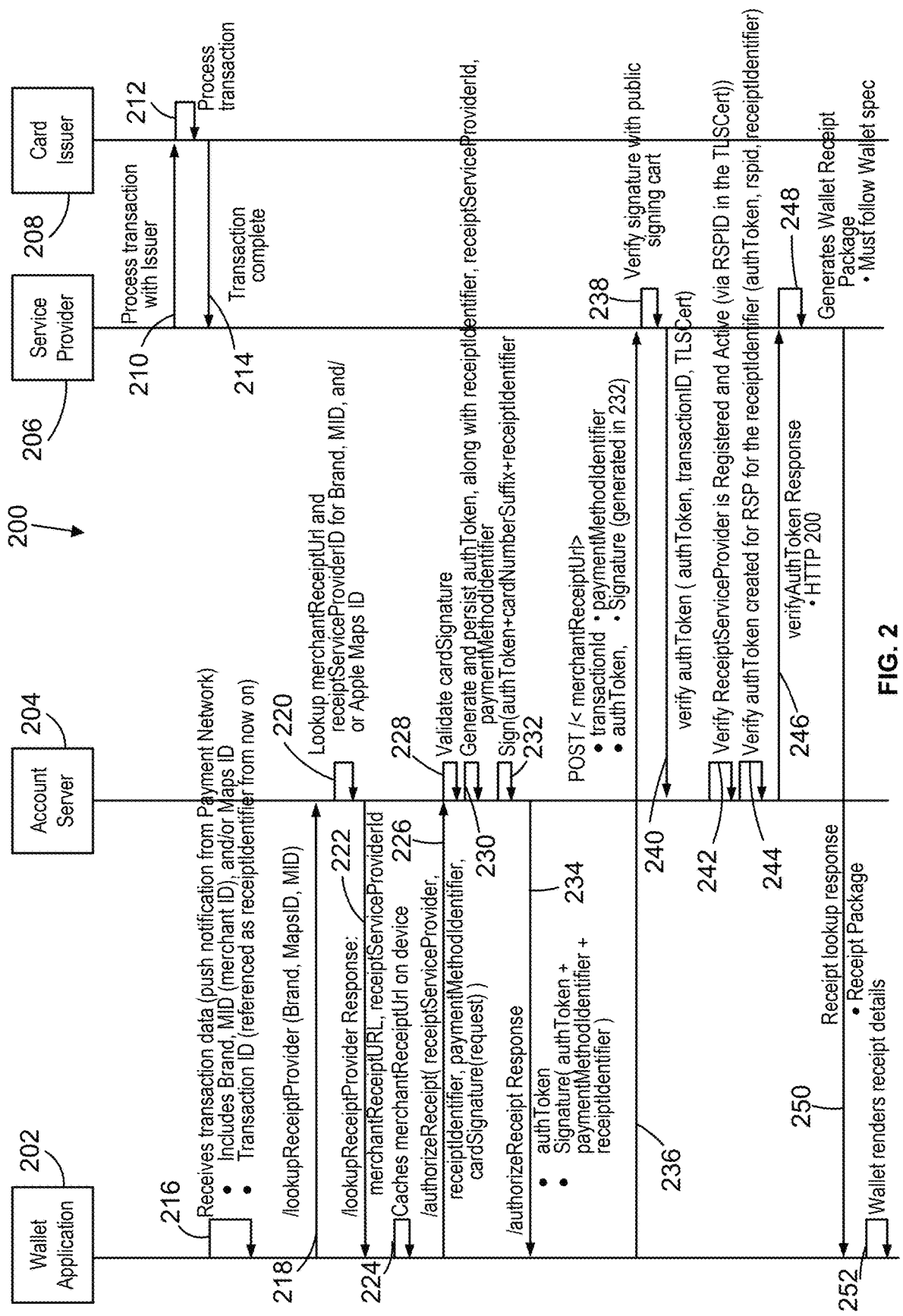
FIG. 2 illustrates an example sequence diagram for illustrating example techniques for providing optimized digital information, according to at least one embodiment.

FIG. 2 illustrates an example sequence diagram 200 for illustrating example techniques for providing optimized digital receipts, according to at least one embodiment. The sequence diagram 200 illustrates communications and operations among a plurality of entities associated with a transaction.

The diagram 200 may include a wallet application 202, an account server 204, and a service provider 206. The wallet application 202 may include one or more of the features of the wallet application 102 (FIG. 1). Further, the account server 204 may include one or more of the features of the account server 104 (FIG. 1). The service provider 206 may include one or more of the features of the service provider 106 (FIG. 1).

The diagram 200 may further include a card issuer 208, which may be referred to as a card issuer 208. The card issuer 208 may comprise a device, such as a computer server, associated with an entity that issues a payment method (such as a credit card, a bank card, or other payment method) utilized by the wallet application 202 to complete the transaction.

The diagram 200 illustrates a plurality of operations among the wallet application 202, the account server 204, service provider 206, and the card issuer 208 related to a transaction of the wallet application 202 and presentation of an optimized digital receipt by the wallet application 202. The optimized digital receipt may include a subset of order information that corresponds to a transaction.

In operation 210, the service provider 206 may initiate processing of a transaction with the card issuer 208. For example, the service provider 206 may transmit a request to process a transaction performed between the wallet application 202 and the service provider 206. The transaction may include the wallet application 202 purchasing a good or service from the service provider 206. The request to process the transaction transmitted by the service provider 206 may include information associated with the transaction required by the card issuer to process the transaction.

In operation 212, the card issuer 208 may process the transaction. For example, the card issuer 208 may utilize the information received in the request to process the transaction from operation 210 to process a transaction. The card issuer 208 may authorize payment to the service provider 206 for the purchase of the goods or service based on the information received in the request to process the transaction.

In operation 214, the card issuer 208 may provide an indication to the service provider 206 that the transaction has been completed. For example, the card issuer 208 may indicate to the service provider 206 that the processing of the transaction from operation 212 has been completed.

In operation 216, the wallet application 202 may receive transaction data. For example, the wallet application 202 may receive transaction data from the service provider 206 and/or the card issuer 208. The transaction data may provide information about the transaction. For example, the transaction data may include a brand ID, a MID, and/or an account ID (which may be a maps ID) for the transaction. The transaction data may further include a transaction ID (which may be referred to as a "receiptIdentifier").

In operation 218, the wallet application 202 may provide a receipt provider lookup request to the account server 204. For example, the wallet application 202 may transmit a receipt provider lookup request requesting information regarding the service provider 206 from the account server 204. The receipt provider lookup request may include the information about the transaction received in operation 216. For example, the wallet application 202 may include the brand ID, the MID, and/or the account ID in the receipt provider lookup request.

In operation 220, the account server 204 may retrieve information regarding the service provider 206 based on the receipt provider lookup request received in operation 218. For example the account server 204 may utilize the information received about the transaction from the receipt provider lookup request to look up information regarding the service provider 206. The information regarding the service provider 206 may include a merchant receipt URL corresponding to the service provider 206 and/or a service provider ID (which may be referred to as a "receiptServiceProviderID") corresponding to the service provider 206. The account server 204 may utilize the brand ID, the MID, and/or the account ID to identify the merchant receipt URL and/or the service provider ID.

In operation 222, the account server 204 may provide the information regarding the service provider 206 to the wallet application 202. For example, the account server 204 may provide the information regarding the service provider 206 from operation to the wallet application, where the information regarding the service provider may include the merchant receipt URL and/or the service provider ID.

In operation 224, the wallet application 202 may cache the merchant receipt URL on the device operating the wallet application 202. For example, the wallet application 202 may save the merchant receipt URL on the device.

In operation 226, the wallet application 202 may request authorization to access an optimized digital receipt. For example, the wallet application 202 may transmit an authorize receipt request to the account server 204 requesting authorization to access an optimized digital receipt, or a subset of order information that corresponds to a transaction to be included in an optimized digital receipt. The authorize receipt request may include information for identifying the optimized digital receipt, or a subset of order information that corresponds to a transaction to be included in the optimized digital receipt, and/or information for validating a user of the wallet application. For example, the authorize receipt request may include the service provider ID, the transaction ID, a payment method identifier, a card signature, or some combination thereof.

In operation 228, the account server 204 may validate the card signature received from the wallet application 202 received in operation 226. For example, the account server 204 may compare the card signature with a known card signature for a user account of the wallet application 202 that will be attempting to retrieve the optimized digital receipt, or a subset of order information that corresponds to a transaction to be included in the optimized digital receipt. In response to determining that the card signature received from the wallet application 202 is not validated against the known card signature, the account server 204 may terminate the operations of the diagram 200 at operation 228. Based on the card signature received from the wallet application 202 being validated against the known card signature, the operations of the diagram 200 may continue.

In operation 230, the account server 204 may generate an authorization token. For example, the account server 204 may generate an authorization token based on the authorize receipt request received in 226. The authorize token may be utilized for determining that the wallet application 202 is authorized to access an optimized digital receipt, or a subset of order information that corresponds to a transaction to be included in an optimized digital receipt. The account server 204 may persist the authorization token. The account server 204 may also persist the receipt identifier, the service provider ID, and/or the payment method ID received in the authorize receipt request of operation 226.

In operation 232, the account server 204 may generate a signature for determining whether the wallet application 202 is authorized to access the optimized digital receipt. For example, the account server 204 may generate a signature based on the authorization token, a card number suffix (which may comprise the last 4 numbers of a payment card utilized for the transaction), and/or the receipt identifier.

In operation 234, the account server 204 may provide information for authorization to the wallet application 202. For example, the account server 204 may transmit an authorize receipt response to the wallet application 202, where information included in the authorize receipt response may be utilized for authorization of a user account associated with the wallet application 202 to access an optimized digital receipt, or a subset of order information that corresponds to a transaction to be included in an optimized digital receipt. The information included in the authorize receipt response may include the authorization token and/or the signature.

In operation 236, the wallet application 202 may request the optimized digital receipt from the service provider 206. For example, the wallet application 202 may transmit a receipt request to the service provider 206, where the receipt request may include information for determining whether the user account associated with the wallet application 202 is authorized to access the optimized digital receipt, or a subset of order information that corresponds to a transaction to be included in the optimized digital receipt, and/or information for identifying the optimized digital receipt, or the subset of order information that corresponds to a transaction to be included in the optimized digital receipt. The information included in the receipt request may include the transaction ID, the payment method identifier, the authorization token, and/or the signature.

In operation 238, the service provider 206 may verify the signature. For example, the service provider 206 may verify the signature received in operation 236 with a public signing cart. In response to verifying the signature is proper with the public signing cart, the operations may proceed. If the signature is determined to be improper during the verification, the operations may terminate at 238.

In operation 240, the service provider 206 may request verification of the authorization token. For example, the service provider 206 may transmit a verify authorization token request to the account server 204. The verify authorization token request may include information for verifying that the user account associated from the wallet application 202 is authorized to access the optimized digital receipt, or the subset of order information that corresponds to a transaction to be included in the optimized digital receipt. The information included in the verify authorization token request may include the authorization token, the transaction ID, and/or a TLS certificate.

In operation 242, the account server 204 may verify the service provider 206 is registered and active. For example, the account server 204 may determine a service provider identifier from the TLS certificate. The TLS certificate may include the service provider identifier. The account server 204 may determine whether the service provider identifier corresponding to the service provider 206 corresponds to a registered and active service provider. For example, the account server 204 may have stored a list of service provider identifiers for registered and active service providers and may compare the service provider identifier corresponding to the service provider 206 to determine whether the service provider 206 is registered and active. If the account server 204 determines that the service provider 206 is not registered or not active, the account server 204 may provide notification to the wallet application 202 that the service provider 206 is not registered or not active, and/or provide notification to the service provider 206 that the service provider 206 is not registered or not active. In some embodiments, the account server 204 may cause a transfer of funds from the wallet application 202 (or a fund account associated with the wallet application 202) to the service provider 206 to be terminated prior to transferring the funds in the transaction.

In operation 244, the account server 204 may verify the authorization token. For example, the account server 204 may verify that the user account associated with the wallet application 202 is authorized to access the optimized digital receipt, or the subset of order information that corresponds to a transaction to be included in the optimized digital receipt, based on the authorization token. The account server 204 determine whether the user account associated with the wallet application by identifying the optimized digital receipt, or a subset of order information that corresponds to a transaction to be included in the optimized digital receipt, to be accessed based on the service provider ID and/or the receipt ID. The account server 204 may identify an authorization token corresponding to the identified optimized digital receipt, or the subset of order information that corresponds to a transaction to be included in the optimized digital receipt. The account server 204 may then compare the authorization token received in the verify authorization token request of operation 240 with the identified authorization token corresponding to the identified optimized digital receipt, or the subset of order information that corresponds to a transaction to be included in the optimized digital receipt, to determine whether the user account associated with the wallet application 202 is authorized to access the optimized digital receipt, or the subset of order information that corresponds to a transaction to be included in the optimized digital receipt. The account server 204 may determine that the user account is authorized to access the optimized digital receipt, or the subset of order information that corresponds to a transaction to be included in the optimized digital receipt, when the received authorization token matches the identified authorization token. Otherwise, the account server 204 may determine that the user account is not authorized to access the optimized digital receipt, or the subset of order information that corresponds to a transaction to be included in the optimized digital receipt. If the account server 204 determines that the user account associated with the wallet application 202 is not authorized to access the optimized digital receipt, or the subset of order information that corresponds to a transaction to be included in the optimized digital receipt, the operations of the diagram 200 may terminate at operation 244. If the account server 204 determines that the user account associated with the wallet application 202 is authorized to access the optimized digital receipt, or the subset of order information that corresponds to a transaction to be included in the optimized digital receipt, the operations may continue.

In operation 246, the account server 204 may provide an indication whether the wallet application 202 is authorized to access the optimized digital receipt. For example, the account server 204 may provide an indication to the service provider 206 that the user account associated with the wallet application 202 is authorized to access the optimized digital receipt, or a subset of order information that corresponds to a transaction to be included in the optimized digital receipt, based on the account server 204 determining the user account is authorized in operation 244. The account server 204 may provide an indication to the service provider 206 that the user account associated with the wallet application 202 is not authorized to access the optimized digital receipt, or a subset of order information that corresponds to a transaction to be included in the optimized digital receipt, based on the account server 204 determining the user account is not authorized in operation 244.

In operation 248, the service provider 206 may generate the optimized digital receipt or a wallet receipt package related to the transaction. For example, the service provider 206 may generate the optimized digital receipt or a wallet receipt package for generation of the optimized digital receipt by the wallet receipt package based on an indication that the user account associated with the wallet application 202 is authorized to access the optimized digital receipt, or the subset of order information that corresponds to a transaction to be included in the optimized digital receipt. The wallet receipt package may include the subset of order information that corresponds to a transaction to be included in the optimized digital receipt and may be formatted in accordance with a specification that defines a format for a wallet receipt package. The optimized digital receipt or wallet receipt package may include subtotals, tax amount, tip amount, service charges, item information (type, title, image), associated people (actors, musicians, directors, producers, or other people associated with the transaction, goods, and/or services), merchant information (merchant name, merchant address, images of a merchant, and/or other information related to a merchant) that may not be accessible to the account server 104.

In operation 250, the service provider 206 may provide the optimized digital receipt or the wallet receipt package to the wallet application 202. The service provider 206 may provide the optimized digital receipt or the wallet receipt package to the wallet application 202 in response to the verify authorization token request of operation 240. As the service provider 206 may provide the optimized digital receipt or the wallet receipt package directly to the wallet application 202, the account server 204 may not access or receive the subset of order information that corresponds to a transaction included in the optimized digital receipt or the wallet receipt package, thereby protecting the privacy of the user of the wallet application 202 for the transaction.

In operation 252, the wallet application 202 may display the optimized digital receipt. For example, the wallet application 202 may display the optimized digital receipt on a UI of the device on which the wallet application 202 is operating. In embodiments where the wallet application 202 receives the wallet receipt package in operation 250, the wallet application 202 may generate the optimized digital receipt using the information from the wallet receipt package and display the optimized digital receipt in operation 252.

Figure 3:
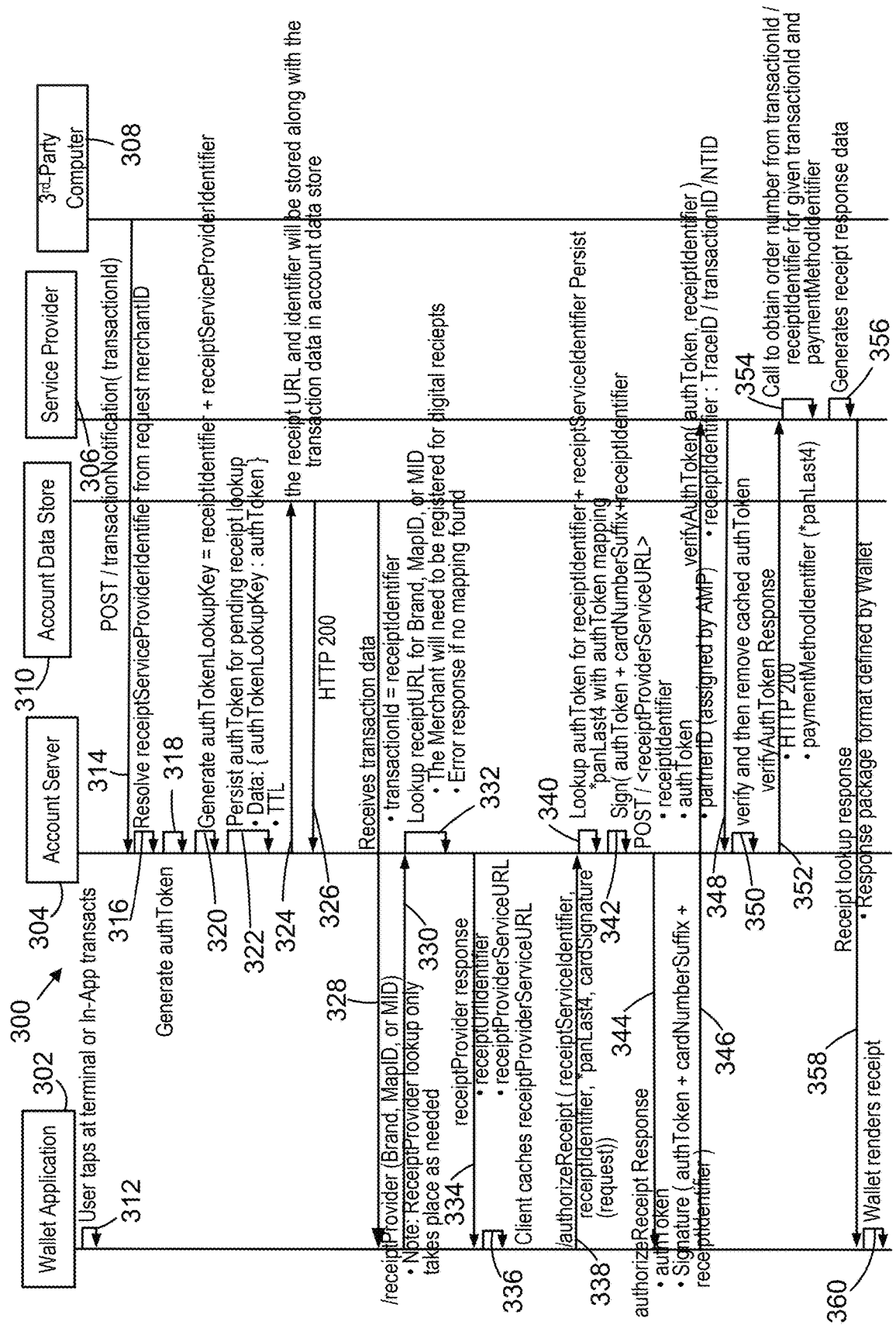
FIG. 3 illustrates an example sequence diagram for illustrating example techniques for providing optimized digital information, according to at least one embodiment.

FIG. 3 illustrates an example sequence diagram 300 for illustrating example techniques for providing optimized digital receipts, according to at least one embodiment. The sequence diagram 300 illustrates communications and operations among a plurality of entities associated with a transaction.

The diagram 300 may include a wallet application 302, an account server 304, and a service provider 306. The wallet application 302 may include one or more of the features of the wallet application 102 (FIG. 1) and/or the wallet application 202 (FIG. 2). Further, the account server 304 may include one or more of the features of the account server 104 (FIG. 1) and/or the account server 204 (FIG. 2). The service provider 306 may include one or more of the features of the service provider 106 (FIG. 1) and/or the service provider 206 (FIG. 2).

The diagram 300 may further include a third-party computer 308. The third-party computer 308 may be a device associated with a merchant that sells good or services. The service provider 306 may provide receipts for the third-party computer 308.

The diagram 300 may further include an account data store 310. The account data store 310 may store data with one or more user accounts, such as user accounts associated with the wallet application 302. Further, the user accounts of the account data store 310 may correspond to the user accounts managed by the account server 304. In some embodiments, for each user account maintained by the account server 304 there may be corresponding space for storage of data corresponding to each of the user accounts on the data store.

The diagram 300 illustrates a plurality of operations among the wallet application 302, the account server 304, service provider 306, third-party computer 308, and the account data store 310 related to a transaction of the wallet application 302 and presentation of an optimized digital receipt by the wallet application 302. The optimized digital receipt may include a subset of order information that corresponds to the transaction.

In operation 312, the wallet application 302 may initiate the transaction. The wallet application 302 may initiate the transaction by purchasing a good or a service, such as purchasing a good or service from the third-party computer 308 or a merchant associated with the third-party computer 308. In some instances, the transaction may be initiated by a user of the wallet application 302 tapping a device on which the wallet application 302 is operating against a transaction terminal, or the user initiates a transaction in an application, associated with the wallet application 302, on the device on which the wallet application 302 is operating.

In operation 314, the third-party computer 308 may provide a transaction notification to the account server 304. For example, the third-party computer 308 may transmit a transaction notification that the transaction had been initiated in operation 312. The transaction may include a transaction ID (which may be referred to as "a receipt ID") for the transaction and/or a MID.

In operation 316, the account server 304 may resolve a service provider ID (which may be referred to as a "receipt service provider ID"). For example, the account server 304 may determine a service provider ID based on the MID received in operation 314.

In operation 318, the account server 304 may generate an authorization token. For example, the account server 304 may generate an authorization token based on the transaction notification. The authorization token may be utilized to determine whether a user account with the wallet application 302 may access an optimized digital receipt, or a subset of order information that corresponds to a transaction to be included in an optimized digital receipt, associated with the transaction.

In operation 320, the account server 304 may generate an authorization token lookup key. For example, the account server 304 may generate the authorization token lookup key based on the transaction ID and the service provider ID. In some embodiments, the account server 304 may combine the transaction ID and the service provider ID to generate the authorization token lookup key.

In operation 322, the account server 304 may persist the authorization token. For example, the account server 304 may store the authorization token generated in operation 318. In some embodiments, the account server 304 may store the authorization token for a set period of time (which may be referred to as TTL) and may be deleted at the end of the set period of time. In these embodiments, the optimized digital receipt cannot be retrieved once the authorization token has been deleted. Accordingly, the optimized digital receipt may be retrieved during the set period of time and cannot be retrieved after the set period of time.

In operation 324, the account server 304 may provide information for obtaining the optimized digital receipt and transaction data to the account data store 310. For example, the account server 304 may provide a service provider URL and/or transaction ID to the account data store 310. The account data store 310 may store the service provider URL and/or the transaction ID along with transaction data. By having the service provider URL, the transaction ID, and/or the transaction data stored in the account data store 310 associated with a user account associated with the wallet application 302, the service provider URL, the transaction ID, and/or the transaction data can be accessed at a later time by the user account.

In operation 326, the account data store 310 may transmit an indication to the account server 304 whether the information for obtaining the optimized digital receipt and transaction data was successfully stored.

In operation 328, the account data store 310 may provide the transaction data to the wallet application 302. For example, the wallet application 302 may retrieve the transaction ID from the account data store 310.

In operation 330, the wallet application 302 may request service provider information from the account server 304. For example, the wallet application 302 may transmit a service provider lookup request to the account server 304. The service provider lookup request may request a URL for the service provider 306 to retrieve the optimized digital receipt. The service provider lookup request may include a brand ID, an account ID (which may be a Map ID), and/or a MID.

In operation 332, the account server 304 may look up a URL for retrieving the optimized digital receipt. For example, the account server 304 may look up a service provider URL for accessing the service provider 306 to retrieve the optimized digital receipt, or the subset of order information that corresponds to the transaction to be included in the optimized digital receipt. The account server 304 may identify the service provider 306 based on the brand ID, the account ID, and/or the MID received in operation 330, and may identify the service provider URL corresponding to the service provider 306. The account server 304 may maintain a list of registered service providers and corresponding service provider URLs and may identify the service provider 306 and corresponding service provider URL from the list of registered service providers and corresponding service provider URLs. If the service provider 306 is not included in the list of registered service providers, the service provider 306 may determine that the service provider 306 is not registered and an optimized digital receipt may not be available for retrieval based on the service provider 306 not being registered. In some embodiments, the account server 304 may further look up a URL for the optimized digital receipt. For example, the account server 304 may identify a receipt URL for retrieving the optimized digital receipt, or the subset of order information that corresponds to the transaction to be included in the optimized digital receipt.

In operation 334, the account server 304 may provide the URL information to the wallet application 302. For example, the account server 304 may transmit a service provider response in response to the service provider request of operation 330, the service provider response including the service provider URL and/or the receipt URL.

In operation 336, the wallet application 302 may cache the URL information received from account server 304. For the wallet application 302 may store the service provider URL and/or the receipt URL.

In some instances, the wallet application 302 may not request the URL information. For example, the wallet application 302 may have previously retrieved and stored the service provider URL and/or the receipt URL and, therefore, may not request the URL information. In these instances, operations 330 through 336 may be omitted.

In operation 338, the wallet application 302 may request authorization information for retrieving the optimized digital receipt. For example, the wallet application 302 may transmit an authorization information request to the account server 304, where the authorization information request requests information to be utilized for determining whether a user account associated with the wallet application 302 is authorized to access the optimized digital receipt, or the subset of order information that corresponds to the transaction to be included in the optimized digital receipt. The authorization information request may include the service provider ID, the transaction ID, a last four digits of a payment method (such as a last four digits of a card used for the transaction, and which may be referred to as a "card number suffix"), and/or a card signature.

In operation 340, the account server 304 may look up an authorization token to be utilized for determining whether the wallet application 302 is authorized to access the optimized digital receipt. For example, the account server 304 may retrieve the authorization token generated in operation 318 for the transaction ID and the service provider ID provided in the authorization information request. Further, the account server 304 may persist the last four digits of the payment method received in operation 338 with mapping to the authorization token.

In operation 342, the account server 304 may generate a signature for the transaction. For example, the account server 304 may generate the signature based on the authorization token, the card number suffix, and/or the transaction ID. The signature may be utilized to determine whether the wallet application 302 is authorized to access the optimized digital receipt, or the subset of order information to be included in the optimized digital receipt.

In operation 344, the account server 304 may provide authorization information to the wallet application 302. For example, the account server 304 may transmit the authorization token identified in operation 340 and/or the signature generated in 342 to the wallet application in an authorization information response.

In operation 346, the wallet application 302 may request the optimized digital receipt from the service provider 306. For example, the wallet application 302 may transmit a receipt lookup request to the service provider 306 that requests the optimized digital receipt, or the subset of order information that is to be included in the optimized digital receipt. The receipt lookup request transmitted by the wallet application 302 may include information for determining whether the user account associated with the wallet application 302 is authorized to access the optimized digital receipt, or the subset of order information that is be included in the optimized digital receipt, and/or information to identify the receipt. For example, the receipt lookup request may include the authorization token, the signature, and/or the transaction ID.

In operation 348, the service provider 306 may request determination of authorization from the account server 304. For example, the service provider 306 may request that the account server 304 verify whether the user account associated with the wallet application 302 is authorized to access the optimized digital receipt, or the subset of order information that is to be included in the optimized digital receipt. The service provider 306 may transmit a verify authorization token request to the account server 304 to have the user account associated with the wallet application 302 verified. The verify authorization token request may include the authorization token and/or the transaction ID.

In operation 350, the account server 304 may verify the authorization token. For example, the account server 304 may compare the authorization token received in operation 348 with the stored authorization token from operation 322 to determine whether the user account associated with the wallet application 302 is authorized to access the optimized digital receipt, or the subset of order information that is to be included in the optimized digital receipt. If the authorization token received in operation 348 matches the stored authorization token from operation 322, the account server 304 may determine that the user account associated with the wallet application 302 is authorized to access the optimized digital receipt, or the subset of order information that is to be included in the optimized digital receipt. If the authorization token received in operation 348 does not match the stored authorization token from operation 322, the account server 304 may determine that the user account associated with the wallet application 302 is not authorized to access the optimized digital receipt, or the subset of order information that is to be included in the optimized digital receipt. If the account server 304 determines that the user account is authorized to access the optimized digital receipt, or the subset of order information that is be included in the optimized digital receipt, the account server may delete the saved authorization token.

In operation 352, the account server 304 may provide an indication whether the wallet application 302 is authorized to access the optimized digital receipt to the service provider 306. For example, the account server 304 may transmit an indication whether the user account associated with the wallet application 302 was determined to be authorized to access the optimized digital receipt, or the subset of order information that is to be included in the optimized digital receipt, to the service provider 306. The indication may be included in a verify authorization token response transmitted to the service provider 306 based on the verify authorization token request from operation 348. Further, the verify authorization token request may include payment method ID, which may comprise the last four digits of the payment method. If the account server 304 indicates that the wallet application 302 is not authorized to access the optimized digital receipt, or the subset of order information that is to be included in the optimized digital receipt, the operations of the diagram 300 may be terminated at operation 352. Otherwise, the operations of the diagram 300 may continue.

In operation 354, the service provider 306 may obtain an order number. For example, the service provider 306 may obtain an order number for the given transaction ID and/or payment method ID based on the transaction ID.

In operation 356, the service provider 306 may generate receipt response data. The receipt response data may include the optimized data receipt, or the subset of order information to be included in the optimized data receipt (which may be referred to as the "wallet receipt package").

In operation 358, the service provider 306 may provide a receipt lookup response to the wallet application 302. For example, the service provider 306 may provide the receipt lookup response based on the receipt lookup response received in 346. The receipt lookup response may include the receipt response data generated in operation 356. In particular, the service provider 306 may transmit the optimized data receipt, or the subset of order information to be included in the optimized data receipt, to the wallet application 302. The service provider 306 may transmit the receipt lookup response directly to the wallet application 302. As the receipt lookup response is transmitted directly to the wallet application 302, the information in the receipt lookup response may not be provided to the account server 304 and may be inaccessible to the account server 304.

In operation 360, the wallet application 302 may render the optimized data receipt. For example, the wallet application 302 may display the optimized data receipt on a user interface of the device on which the wallet application 302 is operating. In instances where the wallet application 302 receives the subset of order information to be included in the optimized data receipt, the wallet application 302 may generate the optimized data receipt in operation 360 to be displayed on the user interface.

Referring now to FIGS. 1-3, in some examples, the service provider may register for the receipt service with the account server. As part of the registration, the service provider may obtain a TLS certificate with embedded service provider ID, obtain an authorization token validation URL (e.g., the location of the account server for making authorization requests), obtain a public signing certification for signature validation, and obtain the wallet specification for formatting the receipt information. Next, a user (e.g., using the mobile device that implements the wallet application) may make an in-app purchase (e.g., within an application of the mobile phone) or an Internet purchase using one or more payments associated with the account of the user at 312 of FIG. 3. This may be any card-on-file transaction or any recurring transaction (e.g., a subscription or the like). In some examples, a third-party server may send a notification of the transaction to the account server at 314 of FIG. 3. The account server can then ingest that information at 316 of FIG. 3 and then generate an authorization token based at least in part on that information at 318 of FIG. 3. The authorization token can be persisted at 322 of FIG. 3. Additionally, the account server can create a record with transaction data for storage on the account data store, this will include the transaction data, a receipt retrieval URL, and the transaction ID. In some examples, the service provider may also be looked up.

In some examples, the wallet application may request authorization to request receipt information from the service provider. The request can be sent to the account server at 226 of FIG. 2, 124 of FIG. 1, and 338 of FIG. 3. In some instances, the authorization token may be generated at this point, and returned to the wallet application (e.g., in a signed packet that includes several things along with the authorization token, including the last four digits of the payment card, and the receipt identifier) at 232 of FIG. 2, 134 of FIG. 1, and 326 of FIG. 3. Once the wallet application has this signed response, the wallet application can make an HTTP POST call to the merchant (e.g., service provider) at 236 of FIG. 2, 134 of FIG. 1, and 346 of FIG. 3. This will include the authorization token and the receipt identifier. The service provider then sends that info to the account server for validation. The account server will check the authorization token received from the service provider to see if it matches the authorization token that was cached for the particular receipt ID at 244 of FIG. 2, 140 of FIG. 1, and 350 of FIG. 3.

In some examples, when the authorization tokens match, the account server will send the verified authorization token back to the service provider at 246 of FIG. 2, 142 of FIG. 1, and 352 of FIG. 3. The last four digits of the payment card used will be sent. The service provider can then use this info to match up to the order number, generate the optimized digital receipt information and send it to the wallet application at 250 of FIG. 2, 146 of FIG. 1, and 358 of FIG. 3. Finally, wallet application can display the receipt with the optimized digital information that was never received by the account server.

In some examples, with the account server acting as the validator and/or authorizer of receipt requests, enables the account server to have additional controls for example white listing merchants. Additionally, in some examples, when a merchant registers for the receipt service, they may provide brand IDs, MIDs, or other information to be used for looking them up when a transaction is identified. Once registered, the account server can provide a TLS certificate so that the service provider can communicate with the account server. That will include the embedded service provider ID. Thus, the account server could block (e.g., black list) authorization requests from certain merchants after the transaction takes place. Additionally, the account server may also be able to validate that the authorization token requests are coming from valid computing devices (e.g., associated with valid accounts). The user's identity can also be validated, and to identify if the user is signed into their account (e.g., a cloud service provider account managed by the account server) at 10 of FIG. 2 and 9 of FIG. 1.

In some examples, when the service provider is a merchant is unknown to the wallet application (e.g., never used before), the wallet application may need to know how to look up the receipt information. Thus, at 5 of FIGS. 2 and 1, the wallet application may make a request for a URL, where the URL points to the address of the service provider. At 7 of FIGS. 2 and 1, the account server may provide the URL back to the wallet application.

In some examples, if a user has multiple mobile devices (e.g., each with their own wallet application), each mobile device would need to go through the same process as in FIGS. 1-3. However, in other examples, the system may be configured such that once a single device downloads the receipt information, the receipt can be persisted in an encrypted form in a shared folder that can be accessed by other devices of the user (or by other devices of other users on a shared/family plan). For example, the receipt can be persisted in the account data store of FIG. 3, and can be requested later by the validated devices, without having to request the receipt information from the service provider again.

Additionally, in some examples, the sequence flows of FIGS. 1-3 may actually be performed twice per transaction. For example, the techniques discussed above may be performed a first time after the initial transaction. However, once the payment settles, and the actual dollar amounts are finalized (e.g., if a tip is added, or additional charges were added at a hotel, etc.), the techniques described above may be performed again in order for the wallet to have finalized receipt information.

Figure 4:
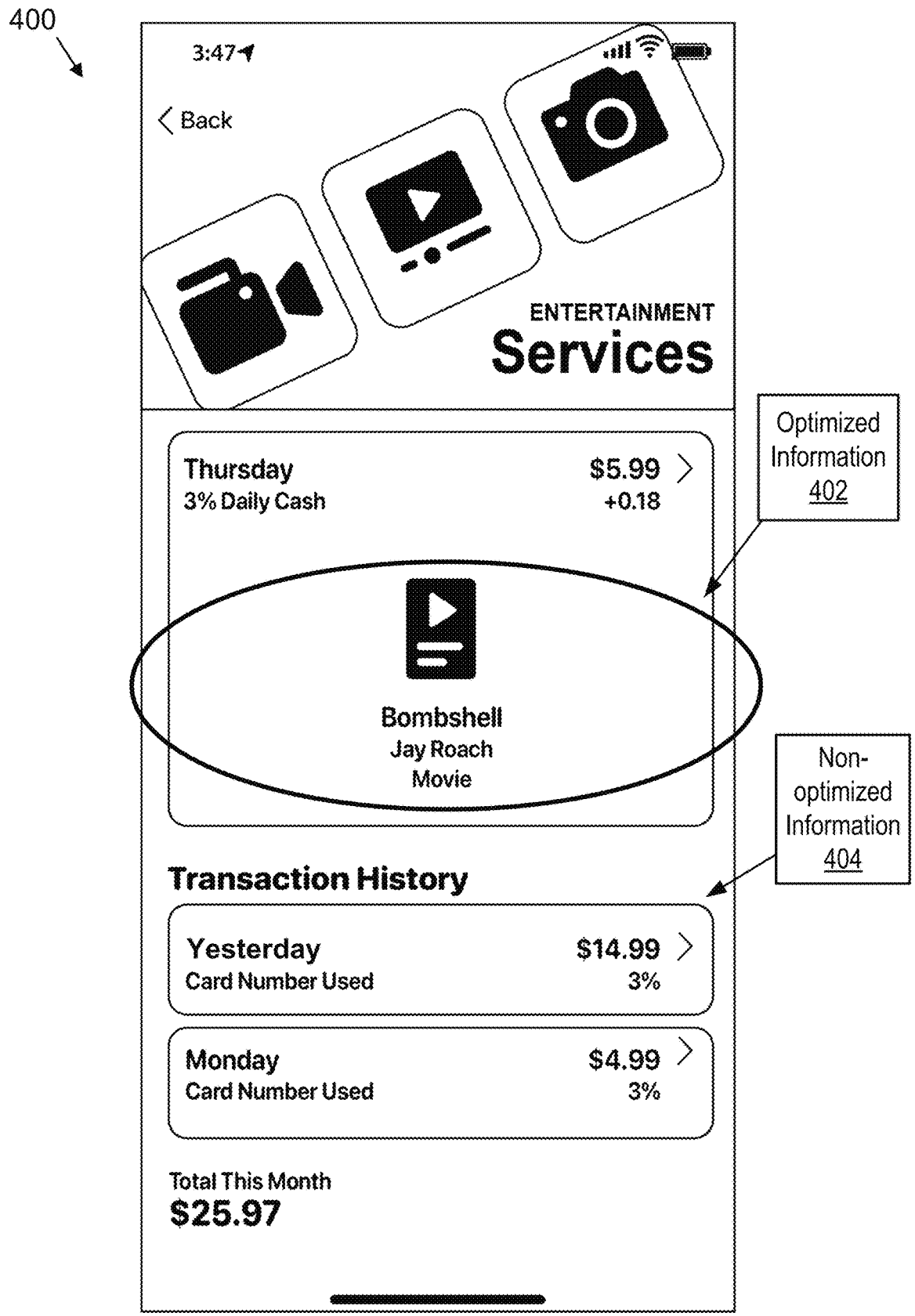
FIG. 4 illustrates an example user interface for illustrating example techniques for providing optimized digital information, according to at least one embodiment.

FIG. 4 illustrates an example user interface 400 for illustrating example techniques for providing optimized digital receipts, according to at least one embodiment. For example, the user interface 400 illustrates an example optimized data receipt, according to at least one embodiment. The user interface may be displayed by a wallet application (such as the wallet application 102 (FIG. 1), the wallet application 202 (FIG. 2), and/or the wallet application 302 (FIG. 3)) on a display of a device on which the wallet application is operating. The optimized data receipt may be the optimized data receipt generated and/or displayed through the operations of the diagram 100 (FIG. 1), the diagram 200 (FIG. 2), and/or the diagram 300 (FIG. 3).

The user interface 400 illustrates an optimized data receipt that includes non-optimized information 404 and optimized information 402. The non-optimized information 404 may include transaction information that is accessible to an account server (such as the account server 104 (FIG. 1), the account server 204 (FIG. 2), and/or the account server 304 (FIG. 3)). Accordingly, the wallet application that displays the user interface 400 may retrieve the non-optimized information 404 for display in the user interface 400 from the account server. In the illustrated embodiment, the non-optimized information 404 may include the day of the transaction, a card number used for the transaction, a total amount of the transaction, and a reward percentage.

The optimized information 402 may include transaction information that is accessible from a service provider (such as the service provider 106 (FIG. 1), the service provider 206 (FIG. 2), and/or the service provider 306 (FIG. 3)). The transaction information that is accessible from the service provider may include additional transaction information to the transaction information accessible to the account server. For example, the transaction information that is accessible from the service provider may include the subset of order information to be included in the optimized digital receipt as provided by the service provider directly to the wallet application, as described in relation to the diagram 100, the diagram 200, and/or the diagram 300. The optimized information 402 may be inaccessible to the account server, thereby providing privacy of the optimized information 402 in regards to the account server. The optimized information 402 includes an indication of the type of good purchased with the transaction (e.g., "Movie"), a description of the good purchased (e.g., "Bombshell"), and an indication of a person associated with the good purchased (e.g., "Jay Roach"). The wallet application may generate the optimized digital receipt including the both the non-optimized information 404 and the optimized information 402 for display on the user interface 400.

In some embodiments, both the non-optimized information 404 and the optimized information 402 may be stored on the service provider and accessible from the service provider, whereas only the non-optimized information 404 may be stored on the account server and accessible from the account server. In these embodiments, the service provider may generate the optimized digital receipt and transmit the optimized digital receipt to the wallet application for display in the user interface 400.

In some embodiments, the wallet application may initially display a non-optimized digital receipt on the user interface 400, where the non-optimized digital receipt only includes the non-optimized information 404. In response to a user interaction with the non-optimized digital receipt, the wallet application may update the user interface 400 to an optimized digital receipt that includes optimized information 402. The update of the user interface 400 may include modifying the non-optimized digital receipt with the optimized information 402 by the wallet application to generate the optimized digital receipt for display or retrieving the optimized digital receipt from the service provider (or an account data store (such as the account data store 310 (FIG. 3)) if the optimized digital receipt was previously provided to the account data store by the service provider) for display.

While certain transaction information is described as being included in the non-optimized information 404 and other transaction information is described as being included in the optimized information 402 in the illustrated embodiment, it should be understood that the information described in regards to the non-optimized information 404 and the optimized information 402 is merely examples and the information included in each may differ in different embodiments. For example, information included in the non-optimized information 404 in the illustrated embodiment may be included in the optimized information 402 in other embodiments, and information included in optimized information 402 in the illustrated embodiment may be included in the non-optimized information 404 in other embodiments. The difference between information included in the non-optimized information 404 and the optimized information 402 may be that the information included in the non-optimized information 404 may be accessible to the account server, whereas the optimized information 402 may be inaccessible to the account server.

Figure 5:
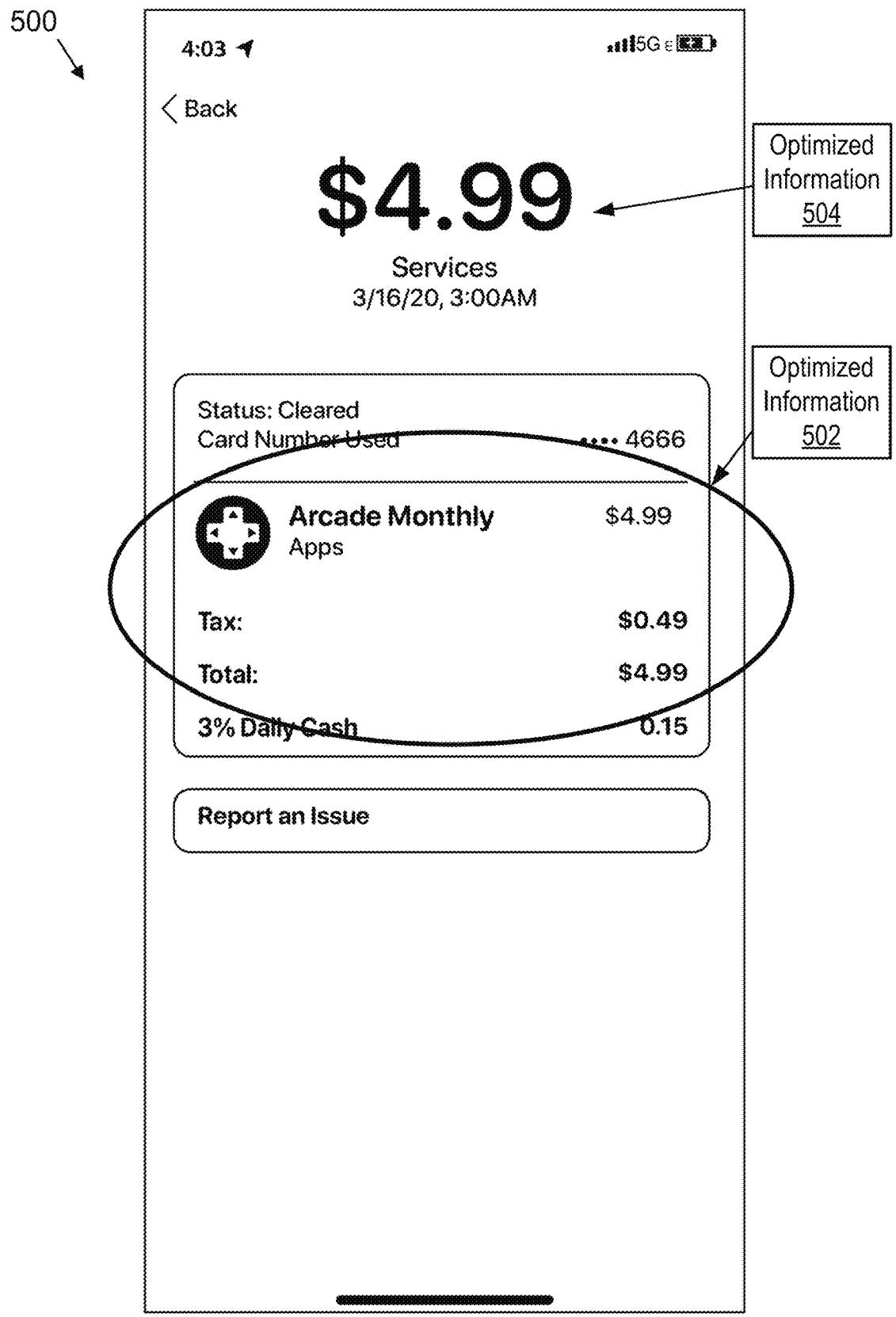
FIG. 5 illustrates an example user interface for illustrating example techniques for providing optimized digital information, according to at least one embodiment.

FIG. 5 illustrates an example user interface 500 for illustrating example techniques for providing optimized digital receipts, according to at least one embodiment. For example, the user interface 500 illustrates an example optimized data receipt, according to at least one embodiment. The user interface may be displayed by a wallet application (such as the wallet application 102 (FIG. 1), the wallet application 202 (FIG. 2), and/or the wallet application 302 (FIG. 3)) on a display of a device on which the wallet application is operating. The optimized data receipt may be the optimized data receipt generated and/or displayed through the operations of the diagram 100 (FIG. 1), the diagram 200 (FIG. 2), and/or the diagram 300 (FIG. 3).

The user interface 500 illustrates an optimized data receipt that includes non-optimized information 504 and optimized information 502. The non-optimized information 504 may include transaction information that is accessible to an account server (such as the account server 104 (FIG. 1), the account server 204 (FIG. 2), and/or the account server 304 (FIG. 3)). Accordingly, the wallet application that displays the user interface 500 may retrieve the non-optimized information 504 for display in the user interface 500 from the account server. In the illustrated embodiment, the non-optimized information 504 may include the day of the transaction, a card number used for the transaction, a total amount of the transaction, a time of the transaction, and a reward percentage.

The optimized information 502 may include transaction information that is accessible from a service provider (such as the service provider 106 (FIG. 1), the service provider 206 (FIG. 2), and/or the service provider 306 (FIG. 3)). The transaction information that is accessible from the service provider may include additional transaction information to the transaction information accessible to the account server. For example, the transaction information that is accessible from the service provider may include the subset of order information to be included in the optimized digital receipt as provided by the service provider directly to the wallet application, as described in relation to the diagram 100, the diagram 200, and/or the diagram 300. The optimized information 502 may be inaccessible to the account server, thereby providing privacy of the optimized information 502 in regards to the account server. The optimized information 502 includes a merchant from which a good was purchased (e.g., "Arcade Monthly"), and an amount of tax (e.g., "$0.49"). The wallet application may generate the optimized digital receipt including the both the non-optimized information 504 and the optimized information 502 for display on the user interface 500.

In some embodiments, both the non-optimized information 504 and the optimized information 502 may be stored on the service provider and accessible from the service provider, whereas only the non-optimized information 504 may be stored on the account server and accessible from the account server. In these embodiments, the service provider may generate the optimized digital receipt and transmit the optimized digital receipt to the wallet application for display in the user interface 500.

In some embodiments, the wallet application may initially display a non-optimized digital receipt on the user interface 500, where the non-optimized digital receipt only includes the non-optimized information 504. In response to a user interaction with the non-optimized digital receipt, the wallet application may update the user interface 500 to an optimized digital receipt that includes optimized information 502. The update of the user interface 500 may include modifying the non-optimized digital receipt with the optimized information 502 by the wallet application to generate the optimized digital receipt for display or retrieving the optimized digital receipt from the service provider (or an account data store (such as the account data store 310 (FIG. 3)) if the optimized digital receipt was previously provided to the account data store by the service provider) for display.

While certain transaction information is described as being included in the non-optimized information 504 and other transaction information is described as being included in the optimized information 502 in the illustrated embodiment, it should be understood that the information described in regards to the non-optimized information 504 and the optimized information 502 is merely examples and the information included in each may differ in different embodiments. For example, information included in the non-optimized information 504 in the illustrated embodiment may be included in the optimized information 502 in other embodiments, and information included in optimized information 502 in the illustrated embodiment may be included in the non-optimized information 504 in other embodiments. The difference between information included in the non-optimized information 504 and the optimized information 502 may be that the information included in the non-optimized information 504 may be accessible to the account server, whereas the optimized information 502 may be inaccessible to the account server.

Figure 6:
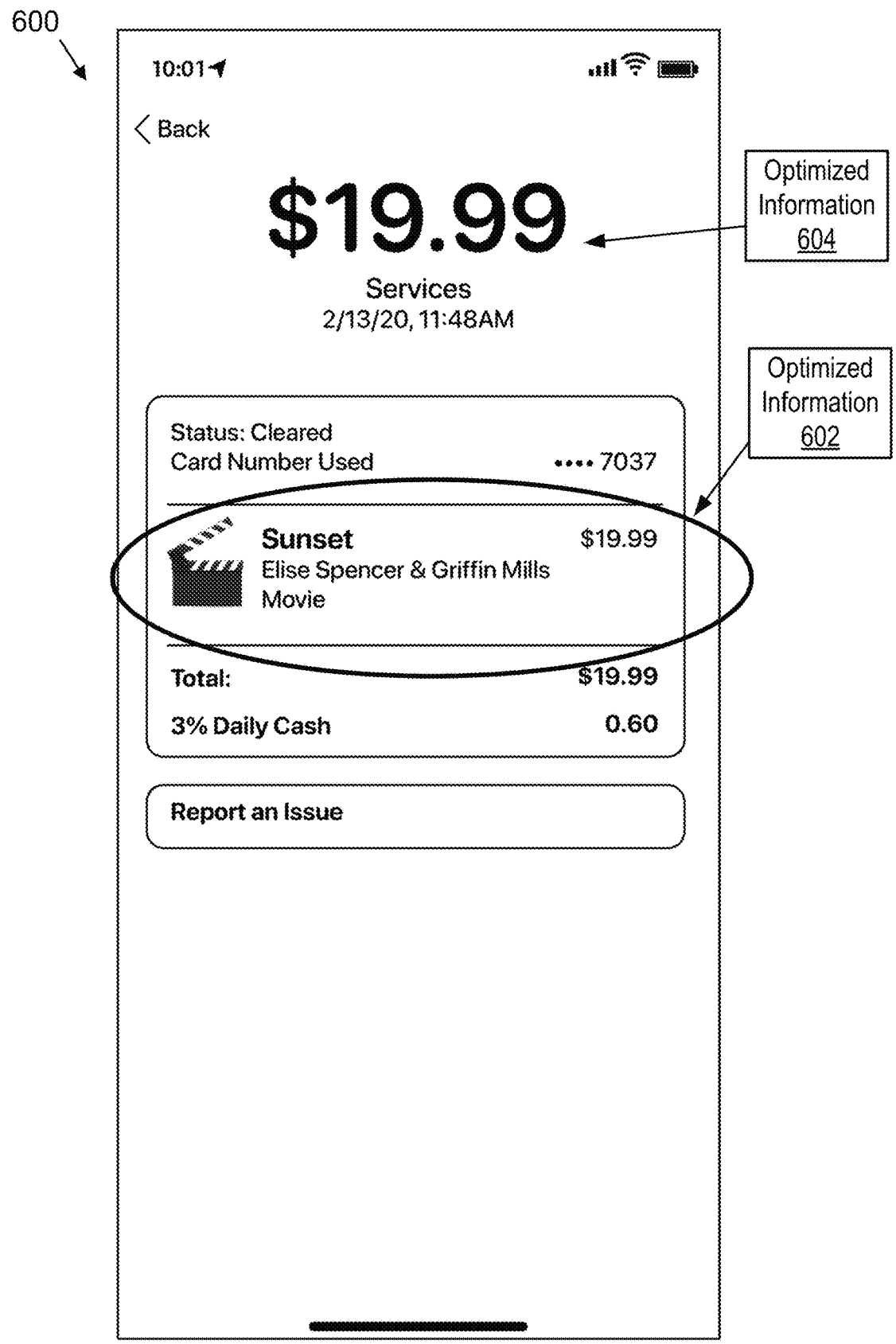
FIG. 6 illustrates an example user interface for illustrating example techniques for providing optimized digital information, according to at least one embodiment.

FIG. 6 illustrates an example user interface 600 for illustrating example techniques for providing optimized digital receipts, according to at least one embodiment. For example, the user interface 600 illustrates an example optimized data receipt, according to at least one embodiment. The user interface may be displayed by a wallet application (such as the wallet application 102 (FIG. 1), the wallet application 202 (FIG. 2), and/or the wallet application 302 (FIG. 3)) on a display of a device on which the wallet application is operating. The optimized data receipt may be the optimized data receipt generated and/or displayed through the operations of the diagram 100 (FIG. 1), the diagram 200 (FIG. 2), and/or the diagram 300 (FIG. 3).

The user interface 600 illustrates an optimized data receipt that includes non-optimized information 604 and optimized information 602. The non-optimized information 604 may include transaction information that is accessible to an account server (such as the account server 104 (FIG. 1), the account server 204 (FIG. 2), and/or the account server 304 (FIG. 3)). Accordingly, the wallet application that displays the user interface 600 may retrieve the non-optimized information 604 for display in the user interface 500 from the account server. In the illustrated embodiment, the non-optimized information 604 may include the day of the transaction, a card number used for the transaction, a total amount of the transaction, a time of the transaction, a type of the transaction (e.g., "Services"), and a reward percentage.

The optimized information 602 may include transaction information that is accessible from a service provider (such as the service provider 106 (FIG. 1), the service provider 206 (FIG. 2), and/or the service provider 306 (FIG. 3)). The transaction information that is accessible from the service provider may include additional transaction information to the transaction information accessible to the account server. For example, the transaction information that is accessible from the service provider may include the subset of order information to be included in the optimized digital receipt as provided by the service provider directly to the wallet application, as described in relation to the diagram 100, the diagram 200, and/or the diagram 300. The optimized information 602 may be inaccessible to the account server, thereby providing privacy of the optimized information 602 in regards to the account server. The optimized information 602 includes a type of good for the transaction (e.g., "Movie"), a title of the good (e.g., "Sunset"), and an indication of people associated with the good purchased (e.g., "Elise Spencer & Griffin Mills"). The wallet application may generate the optimized digital receipt including the both the non-optimized information 604 and the optimized information 602 for display on the user interface 600.

In some embodiments, both the non-optimized information 604 and the optimized information 602 may be stored on the service provider and accessible from the service provider, whereas only the non-optimized information 604 may be stored on the account server and accessible from the account server. In these embodiments, the service provider may generate the optimized digital receipt and transmit the optimized digital receipt to the wallet application for display in the user interface 600.

In some embodiments, the wallet application may initially display a non-optimized digital receipt on the user interface 600, where the non-optimized digital receipt only includes the non-optimized information 604. In response to a user interaction with the non-optimized digital receipt, the wallet application may update the user interface 600 to an optimized digital receipt that includes optimized information

602. The update of the user interface 600 may include modifying the non-optimized digital receipt with the optimized information 602 by the wallet application to generate the optimized digital receipt for display or retrieving the optimized digital receipt from the service provider (or an account data store (such as the account data store 310 (FIG. 3)) if the optimized digital receipt was previously provided to the account data store by the service provider) for display.

While certain transaction information is described as being included in the non-optimized information 604 and other transaction information is described as being included in the optimized information 602 in the illustrated embodiment, it should be understood that the information described in regards to the non-optimized information 604 and the optimized information 602 is merely examples and the information included in each may differ in different embodiments. For example, information included in the non-optimized information 604 in the illustrated embodiment may be included in the optimized information 602 in other embodiments, and information included in optimized information 602 in the illustrated embodiment may be included in the non-optimized information 604 in other embodiments. The difference between information included in the non-optimized information 604 and the optimized information 602 may be that the information included in the non-optimized information 604 may be accessible to the account server, whereas the optimized information 602 may be inaccessible to the account server.

FIGS. 4-6 illustrate example UI screens that include the optimized digital receipts including optimized information 402, optimized information 502, or optimized information 602. There are at least two levels of detail, with FIG. 4 showing a first level of detail showing a list of all transactions (e.g., the transaction history can include multiple days, ranges, etc.). Thus, a subset of details can be shown. If there are multiple items to show, the wallet application may be configured to show only one icon, and then list the number of additional items. If the user were to select the "Bombshell" transaction, a new UI screen (e.g., FIG. 4) would be displayed with additional information (e.g., itemized price per item if appropriate). FIG. 5 illustrates another level of detail for the transaction which illustrates some additional info (e.g., tax, partial payment info (e.g., if part was from a credit card and part from a gift card, etc.)). For example, if a user purchased both a movie and an application, they would both show up in FIG. 5, with respective information for each purchase.

Figure 7:
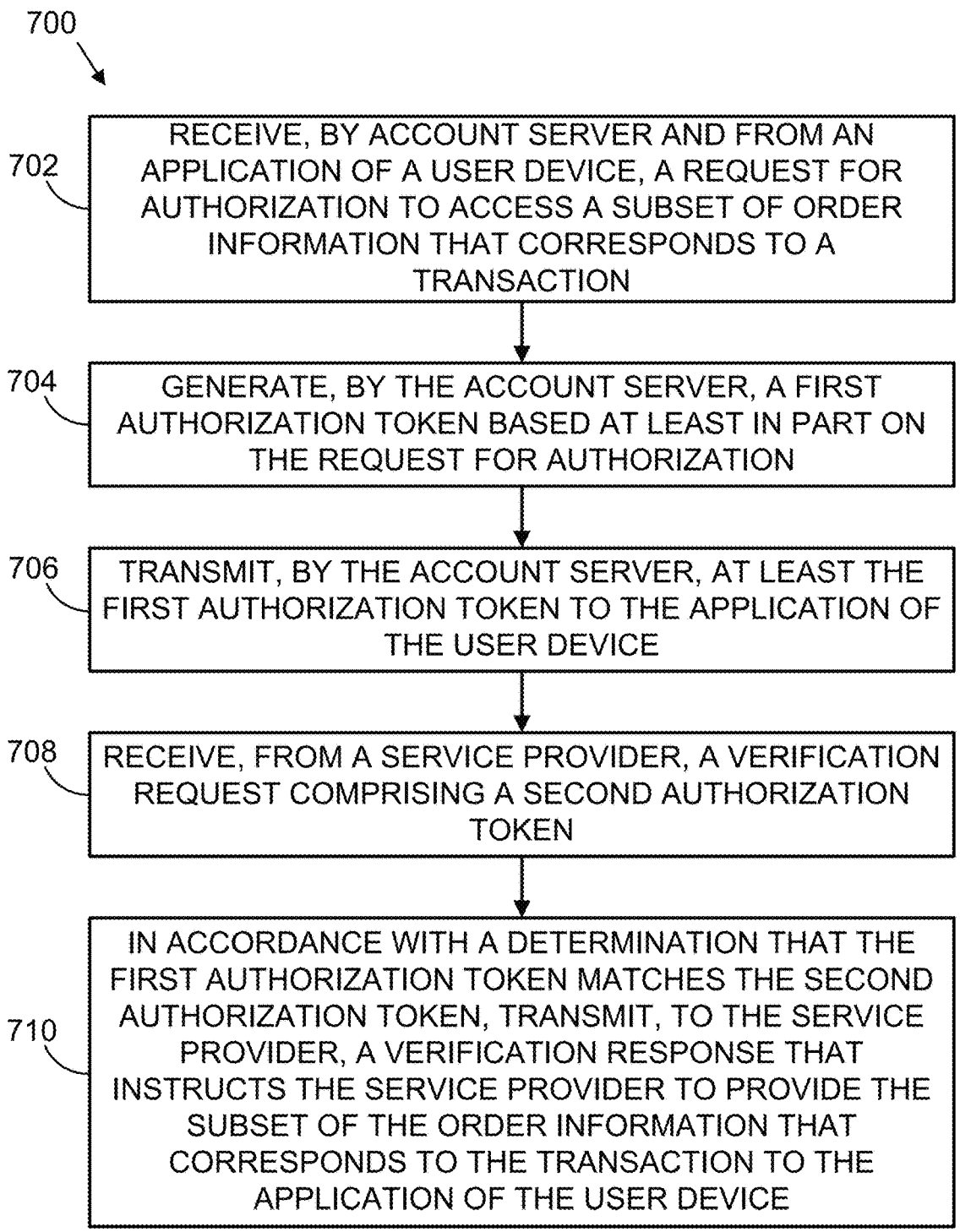
FIG. 7 illustrates an example procedure for providing optimized digital information, according to at least one embodiment.

FIG. 7 illustrates an example procedure 700 for providing optimized digital receipts, according to at least one embodiment. For example, the procedure 700 may provide techniques for providing optimized digital receipts in accordance with the diagram 100 (FIG. 1), the diagram 200 (FIG. 2), and/or the diagram 300 (FIG. 3), or some portion thereof.

In block 702, the procedure 700 may include to receive, by an account server and from an application of a user device, a request for authorization, of the application, to access a subset of order information that corresponds to a transaction. For example, block 702 may include one or more of the features of operation 124 (FIG. 1), operation 226 (FIG. 2), and/or operation 338 (FIG. 3).

In block 704, the procedure 700 may include to generate, by the account server, a first authorization token based at least in part on the request for authorization. For example, block 704 may include one or more of the features of operation 128 (FIG. 1), operation 230 (FIG. 2), and/or operation 320 (FIG. 3).

In block 706, the procedure 700 may include to transmit, by the account server, at least the first authorization token to the application of the user device. For example, block 706 may include one or more of the features of operation 132 (FIG. 1), operation 234 (FIG. 2), and/or operation 344 (FIG. 3).

In block 708, the procedure 700 may include to receive, from a service provider, a verification request comprising a second authorization token. For example, block 708 may include one or more of the features of operation 136 (FIG. 1), operation 240 (FIG. 2), and/or operation 348 (FIG. 3).

In block 710, the procedure 700 may include to verify, by the account server, whether the first authorization token matches the second authorization token. For example, block 710 may include one or more of the features of operation 140 (FIG. 1), operation 244 (FIG. 2), and/or operation 350 (FIG. 3).

In block 712, the procedure 700 may include to, in accordance with a determination that the first authorization token matches the second authorization token, transmit, to the service provider, a verification response that instructs the service provider to provide the subset of the order information that corresponds to the transaction to the application of the user device. For example, block 812 may include one or more of the features of operation 142 (FIG. 1), operation 246 (FIG. 2), and/or operation 352 (FIG. 3).

Figure 8:
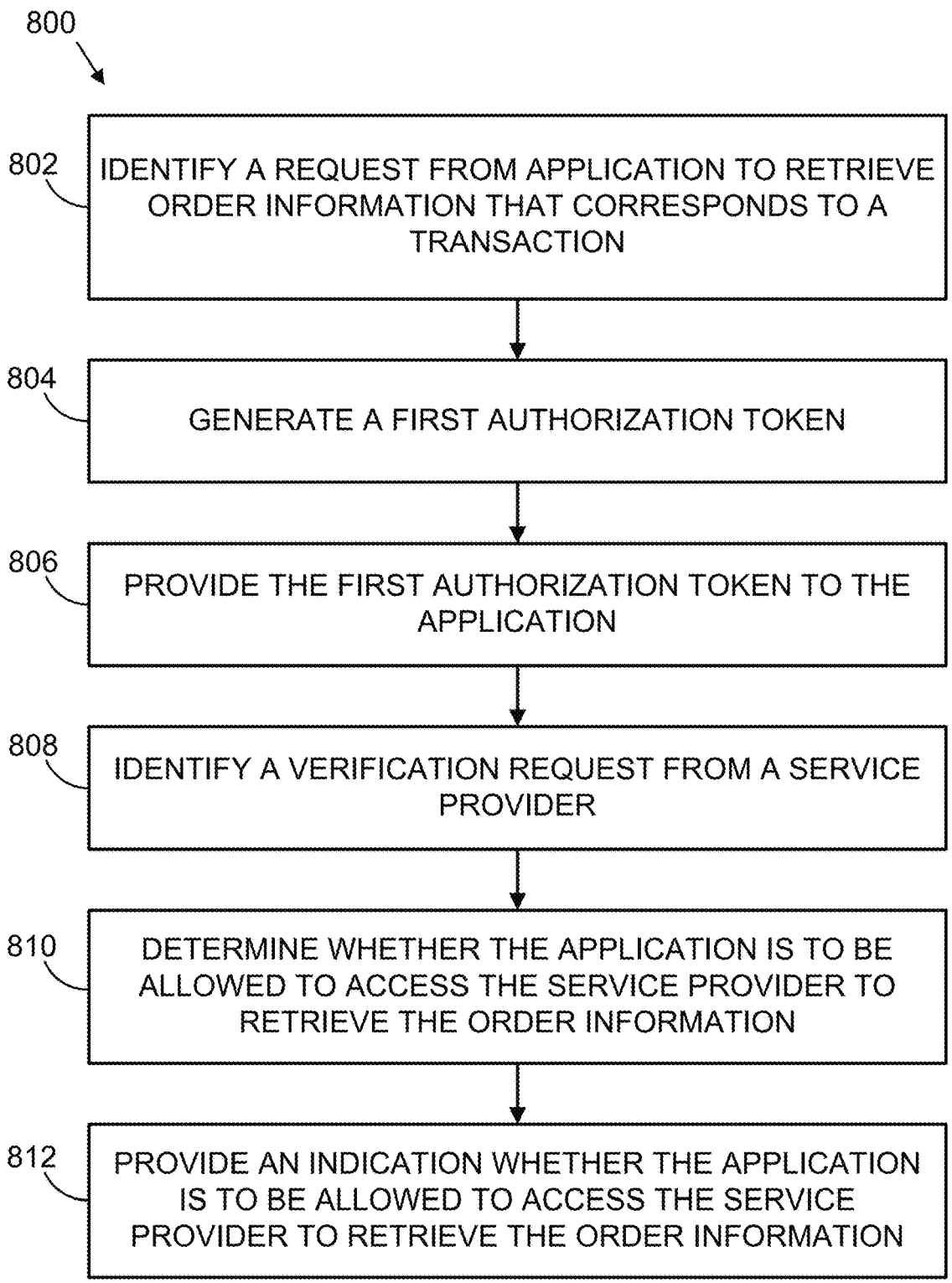
FIG. 8 illustrates an example procedure for providing optimized digital information, according to at least one embodiment.

FIG. 8 illustrates an example procedure 800 for providing optimized digital receipts, according to at least one embodiment. For example, the procedure 800 may provide techniques for providing optimized digital receipts in accordance with the diagram 100 (FIG. 1), the diagram 200 (FIG. 2), and/or the diagram 300 (FIG. 3), or some portion thereof.

In block 802, the procedure 800 may include to identify a request from an application to retrieve order information that corresponds to a transaction. For example, block 802 may include to identify, based at least in part on a transaction between a user account associated with the application of the user device and a service provider associated with a merchant, a request from the application of the user device for authorization to access the service provider to retrieve the order information that corresponds to the transaction from the service provider. For example, block 802 may include one or more of the features of operation 124 (FIG. 1), operation 226 (FIG. 2), and/or operation 338 (FIG. 3).

In block 804, the procedure 800 may include to generate a first authorization token. For example, block 804 may include to generate a first authorization token based at least in part on the request for authorization. For example, block 804 may include one or more of the features of operation 128 (FIG. 1), operation 230 (FIG. 2), and/or operation 320 (FIG. 3).

In block 806, the procedure 800 may include to provide the first authorization token to the application. For example, block 806 may include to provide at least the first authorization token to the application of the user device. For example, block 806 may include one or more of the features of operation 132 (FIG. 1), operation 234 (FIG. 2), and/or operation 344 (FIG. 3).

In block 808, the procedure 800 may include to identify a verification request from a service provider. For example, block 808 may include to identify a verification request comprising a second authorization token associated with an attempted access of the service provider by the user device. For example, block 808 may include one or more of the features of operation 136 (FIG. 1), operation 240 (FIG. 2), and/or operation 348 (FIG. 3).

In block 810, the procedure 800 may include to determine whether the application is to be allowed to access the service provider to retrieve the order information. For example, block 810 may include to determine whether the application of the user device is to be allowed to access the service provider to retrieve the order information based on whether the first authorization token matches the second authorization token. For example, block 810 may include one or more of the features of operation 140 (FIG. 1), operation 244 (FIG. 2), and/or operation 350 (FIG. 3).

In block 812, the procedure 800 may include to provide an indication whether the application is to be allowed to access the service provider to retrieve the order information. For example, block 812 may include to provide, to the service provider, an indication whether the application of the user device is to be allowed to access the service provider to retrieve the order information based on the determination whether the application of the user device is to be allowed to access the service provider to retrieve the order information. For example, block 812 may include one or more of the features of operation 142 (FIG. 1), operation 246 (FIG. 2), and/or operation 352 (FIG. 3).

Figure 9:
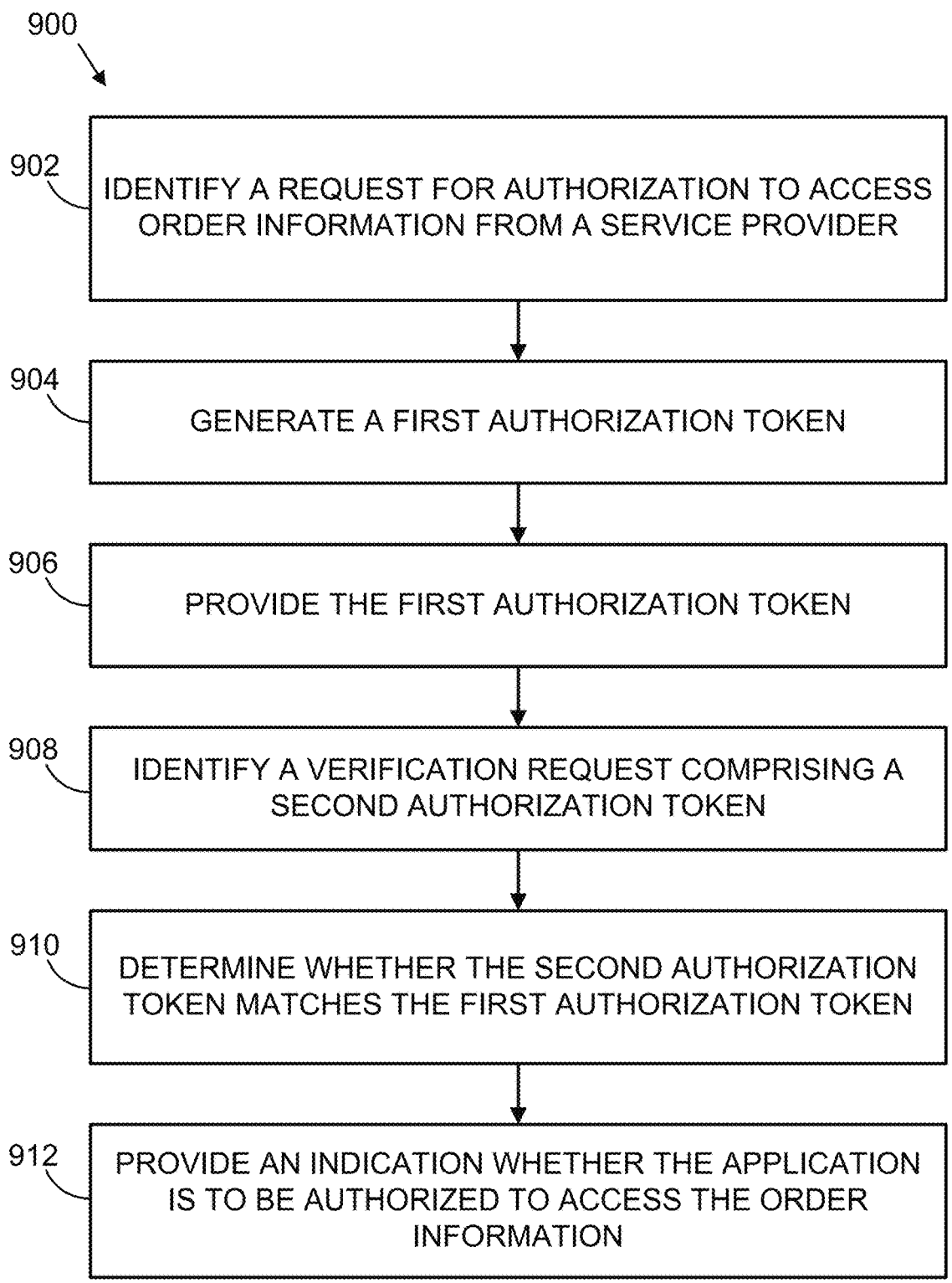
FIG. 9 illustrates an example procedure for providing optimized digital information, according to at least one embodiment.

FIG. 9 illustrates an example procedure 900 for providing optimized digital receipts, according to at least one embodiment. For example, the procedure 900 may provide techniques for providing optimized digital receipts in accordance with the diagram 100 (FIG. 1), the diagram 200 (FIG. 2), and/or the diagram 300 (FIG. 3), or some portion thereof.

In block 902, the procedure 900 may include to identify a request for authorization to access order information from a service provider. For example, block 902 may include to identify, from an application of a user device, a request for authorization to access order information from a service provider, the order information corresponding to a transaction between a user account associated with the application of the user device and the service provider. For example, block 902 may include one or more of the features of operation 124 (FIG. 1), operation 226 (FIG. 2), and/or operation 338 (FIG. 3).

In block 904, the procedure 900 may include to generate a first authorization token. For example, block 904 may include to generate a first authorization token based at least in part on the request for authorization. For example, block 804 may include one or more of the features of operation 128 (FIG. 1), operation 230 (FIG. 2), and/or operation 320 (FIG. 3).

In block 906, the procedure 900 may include to provide the first authorization token. For example, block 906 may include to provide, to the application of the user device, the first authorization token. For example, block 906 may include one or more of the features of operation 132 (FIG. 1), operation 234 (FIG. 2), and/or operation 344 (FIG. 3).

In block 908, the procedure 900 may include to identify a verification request comprising a second authorization token. For example, block 908 may include to identify, from the service provider, a verification request comprising a second authorization token. For example, block 908 may include one or more of the features of operation 136 (FIG. 1), operation 240 (FIG. 2), and/or operation 348 (FIG. 3).

In block 910, the procedure 900 may include to determine whether the second authorization token matches the first authorization token. For example, block 910 may include to determine whether the second authorization token matches the first authorization token. For example, block 910 may include one or more of the features of operation 140 (FIG. 1), operation 244 (FIG. 2), and/or operation 350 (FIG. 3).

In block 912, the procedure 900 may include to provide an indication whether the application is to be authorized to access the order information. For example, block 912 may include to provide, to the service provider, an indication whether the application of the user device is to be authorized to access the order information based on the determination whether the second authorization token matches the first authorization token. For example, block 812 may include one or more of the features of operation 142 (FIG. 1), operation 246 (FIG. 2), and/or operation 352 (FIG. 3).

Figure 10:
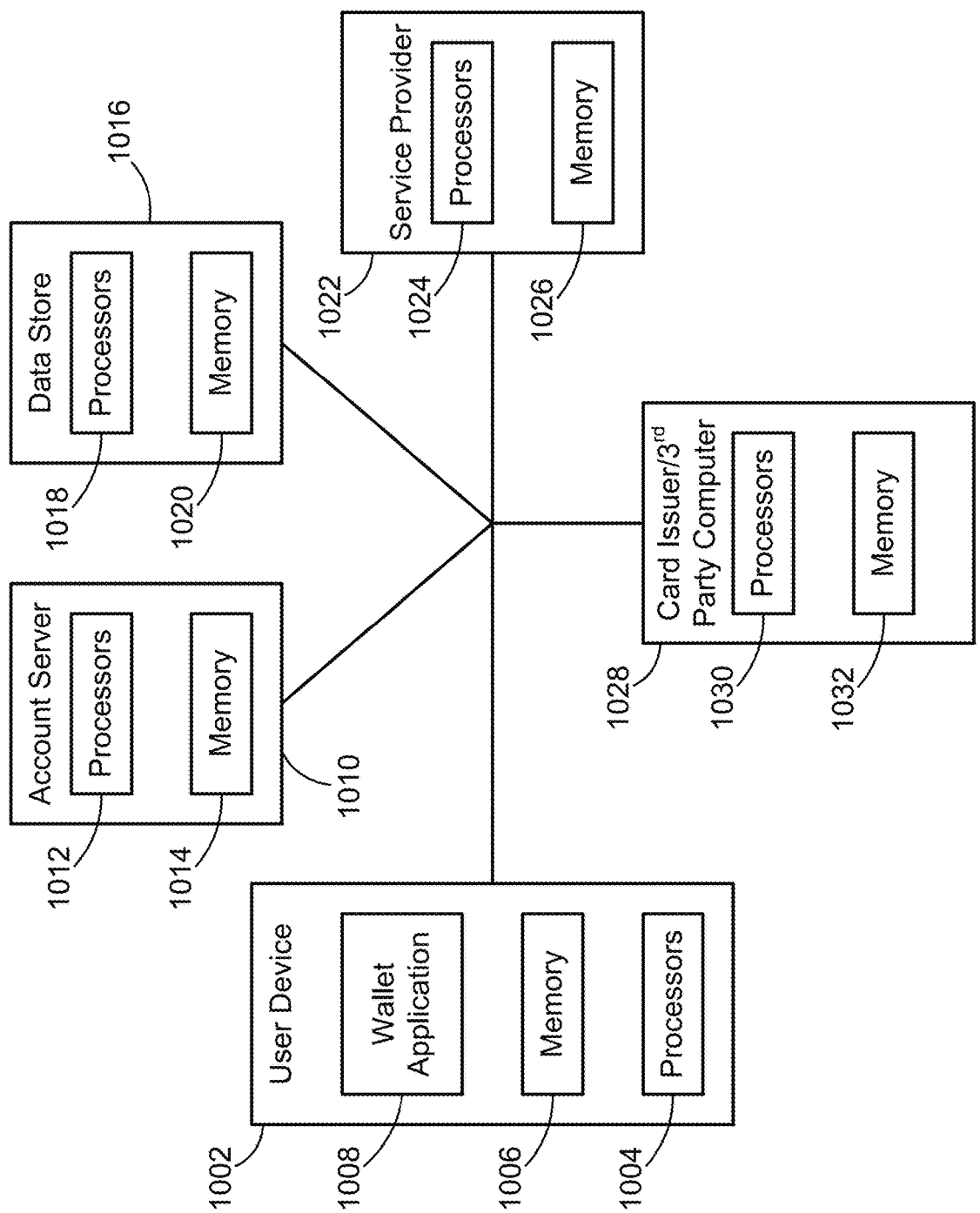
FIG. 10 illustrates an example system that may implement the procedures described herein, according to at least one embodiment.

FIG. 10 illustrates an example system 1000 that may implement the procedures described herein, according to at least one embodiment. For example, the system 1000 may include a plurality of entities corresponding to the entities of the diagram 100 (FIG. 1), the diagram 200 (FIG. 2), and/or the diagram 300 (FIG. 3), and the system 1000 may perform the operations of the diagram 100, the diagram 200, and/or the diagram 300. The entities of the system 1000 may be coupled to each other entity, or each of the entities may be coupled to one or more of the entity. For clarity, the entities of the system 1000 are illustrated as all being coupled at a central point, but it should be understood that the coupling between the entities may be different in different embodiments.

The system 1000 may include a user device 1002. The user device 1002 may include one or more processors 1004 that may execute one or more computer-executable instruction. The user device 1002 may further include a memory 1006 coupled to the processors 1004, where the memory 1006 more store computer-executable instructions that may be executed by the processors 1004. The user device 1002 may further implement a wallet application 1008, such as the wallet application 102 (FIG. 1), the wallet application 202 (FIG. 2), and the wallet application 302. The wallet application 1008 may perform one or more of the operations performed by the wallet application 102, the wallet application 202, and/or the wallet application 302 as described throughout this disclosure.

The system 1000 may include an account server 1010. The account server 1010 may include one or more processors 1012 that may execute one or more computer-executable instruction. The account server 1010 may further include a memory 1014 coupled to the processors 1012, where the memory 1014 more store computer-executable instructions that may be executed by the processors 1012. The account server 1010 may include one or more of the features of the account server 104 (FIG. 1), the account server 204 (FIG. 2), and/or the account server 304 (FIG. 3), and may perform one or more of the operations performed by the account server 104, the account server 204, and/or the account server 304 as described throughout this disclosure.

The system 1000 may include a data store 1016. The data store 1016 may include one or more processors 1018 that may execute one or more computer-executable instruction. The data store 1016 may further include a memory 1020 coupled to the processors 1018, where the memory 1020 more store computer-executable instructions that may be executed by the processors 1018. The data store 1016 may include one or more of the features of the account data store 310 (FIG. 3), and may perform one or more of the operations performed by the account data store 310 as described throughout this disclosure.

The system 1000 may include a service provider 1022. The service provider 1022 may include one or more processors 1024 that may execute one or more computer-executable instruction. The service provider 1022 may further include a memory 1026 coupled to the processors 1024, where the memory 1026 more store computer-executable instructions that may be executed by the processors 1024. The service provider 1022 may include one or more of the features of the service provider 106 (FIG. 1), the service provider 206 (FIG. 2), and/or the service provider 306 (FIG. 3), and may perform one or more of the operations performed by the service provider 106, the service provider 206, and/or the service provider 306 as described throughout this disclosure.

The system 1000 may include a card issuer/third-party computer 1028. The card issuer/third-party computer 1028 may include one or more processors 1030 that may execute one or more computer-executable instruction. The card issuer/third-party computer 1028 may further include a memory 1032 coupled to the processors 1030, where the memory 1032 more store computer-executable instructions that may be executed by the processors 1030. The card issuer/third-party computer 1028 may include one or more of the features of the card issuer 208 (FIG. 2) and/or the third-party computer 308 (FIG. 3), and may perform one or more of the operations performed by the card issuer 208 and/or the third-party computer 308 as described throughout this disclosure.

As described above, one aspect of the present technology is the gathering and presenting of transaction data (e.g., purchase information, etc.). The present disclosure contemplates that in some instances, this gathered data may include personally identifiable information (PII) data that uniquely identifies or can be used to contact or locate a specific person. Such personal information data can include credit card information, demographic data, location-based data (e.g., GPS coordinates), telephone numbers, email addresses, purchase history, home addresses, or any other identifying or personal information.

The present disclosure recognizes that the use of such personal information data, in the present technology, can be used to the benefit of users. For example, the personal information data can be used to present valuable receipt information in a user interface.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

EXAMPLES

In the following sections, further exemplary embodiments are provided.

Example 1 may include a method, comprising receiving, by an account server and from an application of a user device, a request for authorization, of the application, to access a subset of order information that corresponds to a transaction, generating, by the account server, a first authorization token based at least in part on the request for authorization, transmitting, by the account server, at least the first authorization token to the application of the user device, receiving, by the account server from a service provider, a verification request comprising a second authorization token, determining, by the account server, whether the first authorization token matches the second authorization token, and transmitting, by the account server to the service provider, an indication whether the service provider is to provide the subset of the order information that corresponds to the transaction to the application of the user device based on whether the first authorization token matches the second authorization token.

Example 2 may include the method of example 1, wherein the request is a second request, and further comprising receiving, from the application of the user device, a first request prior to the second request, the first request for access to at least the subset of the order information that corresponds to the transaction, and transmitting, to the application of the user device, a network location for accessing the subset of the order information that corresponds to the transaction.

Example 3 may include the method of example 2, wherein the first request is received at least in response to the transaction.

Example 4 may include the method of example 1, wherein the service provider corresponds to a merchant, wherein the transaction is between the user device and the merchant, and wherein the user device is associated with a user account.

Example 5 may include the method of example 4, wherein the service provider is configured to manage the order information associated with the user account.

Example 6 may include the method of example 1, further comprising receiving, by the account server, a registration request from the service provider, and providing, by the account server, authorization token validation information to the service provider at least in response to the registration request.

Example 7 may include the method of example 6, further comprising, transmitting, to the service provider, application configuration information, wherein the application configuration information instructs the service provider of a format for the subset of the order information that corresponds to the transaction.

Example 8 may include the method of example 7, wherein the format for the subset of the order information enables presentation, on a user interface associated with the application of the user device, of the subset of the order information that corresponds to the transaction.

Example 9 may include the method of example 1, wherein the first authorization token is generated based at least in part on validating the request.

Example 10 may include the method of example 1, wherein the order information is inaccessible by the account server.

Example 11 may include the method of example 10, wherein transaction information that identifies the transaction is accessible by the account server.

Example 12 may include the method of example 1, further comprising validating the application of the user device prior to generating the first authorization token, wherein the validation is based at least in part on a user account associated with the user device.

Example 13 may include one or more computer-readable storage media comprising computer-executable instructions that, when executed by one or more processors, cause the one or more processors to identify, based at least in part on a transaction between a user account associated with an application of a user device and a service provider associated with a merchant, a request from the application of the user device for authorization to access the service provider to retrieve order information that corresponds to the transaction from the service provider, generate a first authorization token based at least in part on the request for authorization, provide at least the first authorization token to the application of the user device, identify, from the service provider, a verification request comprising a second authorization token associated with an attempted access of the service provider by the user device, determine whether the application of the user device is to be allowed to access the service provider to retrieve the order information based on whether the first authorization token matches the second authorization token, and provide, to the service provider, an indication whether the application of the user device is to be allowed to access the service provider to retrieve the order information based on the determination whether the application of the user device is to be allowed to access the service provider to retrieve the order information.

Example 14 may include the one or more computer-readable storage media of example 13, wherein the request from the application of the user device includes a card signature associated with the user account, wherein the instructions, when executed by the one or more processors, further cause the one or more processors to validate the card signature, wherein the first authorization token is to be generated based on the card signature being validated.

Example 15 may include the one or more computer-readable storage media of example 13, wherein the request is a first request, wherein the instructions, when executed by the one or more processors, further cause the one or more processors to identify a second request from the application of the user device for a web resource for the service provider, wherein the second request includes identification information for the service provider, determine, based at least in part on the identification information, whether the service provider is a bad actor, and determine whether to terminate the transaction based at least in part on determination whether the service provider is the bad actor.

Example 16 may include the one or more computer-readable storage media of example 13, wherein the indication whether the application of the user device is to be allowed to access the service provider comprises an indication that the application of the user device is to be allowed to access the service provider, and wherein the service provider is to provide the order information directly to the user device.

Example 17 may include the one or more computer-readable storage media of example 13, wherein the instructions, when executed by the one or more processors, further cause the one or more processors to identify a registration request from the service provider, generate a transport layer security (TLS) certificate with a identifier corresponding to service provider, and provide the TLS certificate to the service provider, the TLS certificate to be utilized for the determination whether the application of the user device is to be allowed to access the service provider.

Example 18 may include a device, comprising one or more processors to identify, from an application of a user device, a request for authorization to access order information from a service provider, the order information corresponding to a transaction between a user account associated with the application of the user device and the service provider, generate a first authorization token based at least in part on the request for authorization, provide, to the application of the user device, the first authorization token, identify, from the service provider, a verification request comprising a second authorization token, determine whether the second authorization token matches the first authorization token, and provide, to the service provider, an indication whether the application of the user device is authorized to access the order information based on the determination whether the second authorization token matches the first authorization token, and memory coupled to the one or more processors, the memory to persist the first authorization token for the determination whether the second authorization token matches the first authorization token.

Example 19 may include the device of example 18, wherein to determine whether the second authorization token matches the first authorization token comprises to determine that the second authorization token matches the first authorization token, and wherein the one or more processors are further to cause the first authorization token to be deleted from the memory based on the indication whether the application of the user device is authorized to access the order information being provided to the service provider.

Example 20 may include the device of example 18, wherein the one or more processors are further to identify, from the service provider, a request to register with the device, and provide, to the service provider, an authorization token validation web resource based at least in part on the request to register, wherein the service provider is to utilize the authorization token validation web resource to provide the verification request to the device.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method, comprising:
receiving, by an account server, a registration request from a service provider;
communicating, by the account server to the service provider, authorization token validation information, the authorization token validation information including an authorization token validation uniform resource locator (URL) for communicating with the account server to determine authorization for user devices to access data stored on the service provider;
communicating, by the account server to an application of a user device, a first data subset of order information that corresponds to a transaction, the first data subset of the order information accessible to the account server and to be displayed in a first receipt format;
receiving, by the account server and from the application, a request for authorization, of the application, to access a second data subset of the order information that corresponds to the transaction, the second data subset of the order information being inaccessible to the account server;
generating, by the account server, a first authorization token based at least in part on the request for authorization;
storing, by the account server, the first authorization token in a memory of the account server;

communicating, by the account server, at least the first authorization token to the application of the user device;

receiving, by the account server from the service provider via the authorization token validation URL, a verification request comprising a second authorization token;

retrieving, by the account server from the memory, the first authorization token;

determining, by the account server, whether the first authorization token matches the second authorization token; and communicating, by the account server to the service provider, an indication of whether the service provider is to provide the second data subset of the order information that corresponds to the transaction to the application of the user device based at least in part on whether the first authorization token matches the second authorization token, the second data subset of the order information to be displayed in a second receipt format with at least a portion of the first data subset of the order information.

2. The method of claim 1, wherein the request is a second request, and further comprising:

receiving, from the application of the user device, a first request prior to the second request, the first request for access to at least the second data subset of the order information that corresponds to the transaction; and transmitting, to the application of the user device, a network location for accessing the second data subset of the order information that corresponds to the transaction.

3. The method of claim 2, wherein the first request is received at least in response to the transaction.

4. The method of claim 1, wherein the service provider corresponds to a merchant, wherein the transaction is between the user device and the merchant, and wherein the user device is associated with a user account.

5. The method of claim 4, wherein the service provider is configured to manage the order information associated with the user account.

6. The method of claim 1, further comprising, transmitting, to the service provider, application configuration information, wherein the application configuration information instructs the service provider of a format for the second data subset of the order information that corresponds to the transaction.

7. The method of claim 6, wherein the format for the second data subset of the order information enables presentation, on a user interface associated with the application of the user device, of the second data subset of the order information that corresponds to the transaction.

8. The method of claim 1, wherein the first authorization token is generated based at least in part on validating the request.

9. The method of claim 1, wherein transaction information that identifies the transaction is accessible by the account server.

10. The method of claim 1, further comprising validating a card signature from the application of the user device prior to generating the first authorization token.

11. One or more non-transitory computer-readable storage media comprising computer-executable instructions that, when executed by one or more processors, cause the one or more processors to:

receive a registration request from a service provider;

communicate, to the service provider, authorization token validation information, the authorization token validation information including an authorization token validation uniform resource locator (URL) for communicating with an account server to determine authorization for user devices to access data stored on the service provider;

communicate, to an application of a user device, a first data subset of order information that corresponds to a transaction, the first data subset of the order information accessible to the account server and to be displayed in a first receipt format;

receive, from the application, a request for authorization, of the application, to access a second data subset of the order information that corresponds to the transaction, the second data subset of the order information being inaccessible to the account server;

generate a first authorization token based at least in part on the request for authorization;

store the first authorization token in a memory of the account server;

communicate at least the first authorization token to the application of the user device;

receive, from the service provider via the authorization token validation URL, a verification request comprising a second authorization token;

retrieve, from the memory, the first authorization token;

determine, whether the first authorization token matches the second authorization token; and communicate, to the service provider, an indication of whether the service provider is to provide the second data subset of the order information that corresponds to the transaction to the application of the user device based at least in part on whether the first authorization token matches the second authorization token, the second data subset of the order information to be displayed in a second receipt format with at least a portion of the first data subset of the order information.

12. The one or more non-transitory computer-readable storage media of claim 11, wherein the request is a second request, and wherein the computer executable instructions, when executed by the one or more processors, further cause the one or more processors to:

receive, from the application of the user device, a first request prior to the second request, the first request for access to at least the second data subset of the order information that corresponds to the transaction; and transmit, to the application of the user device, a network location for accessing the second data subset of the order information that corresponds to the transaction.

13. The one or more non-transitory computer-readable storage media of claim 12, wherein the first request is received at least in response to the transaction.

14. The one or more non-transitory computer-readable storage media of claim 11, wherein the service provider corresponds to a merchant, wherein the transaction is between the user device and the merchant, and wherein the user device is associated with a user account.

15. A device, comprising:

one or more processors to:

receive a registration request from a service provider;

communicate, to the service provider, authorization token validation information, the authorization token validation information including an authorization token validation uniform resource locator (URL) for communicating with an account server to determine authorization for user devices to access data stored on the service provider;

communicate, to an application of a user device, a first data subset of order information that corresponds to a transaction, the first data subset of the order information accessible to the account server and to be displayed in a first receipt format;

receive, from the application, a request for authorization, of the application, to access a second data subset of the order information that corresponds to transaction, the second data subset of the order information being inaccessible to the account server;

generate a first authorization token based at least in part on the request for authorization;

store the first authorization token in a memory of the account server;

communicate at least the first authorization token to the application of the user device;

receive, from the service provider via the authorization token validation URL, a verification request comprising a second authorization token;

retrieve, from the memory, the first authorization token;

determine whether the first authorization token matches the second authorization token; and communicate, to the service provider, an indication of whether the service provider is to provide the second data subset of the order information that corresponds to the transaction to the application of the user device based at least in part on whether the first authorization token matches the second authorization token, the second data subset of the order information to be displayed in a second receipt format with at least a portion of the first data subset of the order information; and memory coupled to the one or more processors, the memory to store the first authorization token.

16. The device of claim 15, wherein the first authorization token is generated based at least in part on validating the request.

17. The method of claim 1, wherein the registration request includes information for user devices to retrieve portions of the data directly from the service provider, wherein the request for authorization includes information for identifying the service provider, wherein the method further comprises:

determining, by the account server, that the application of the user device is attempting to access the second data subset of the order information from the service provider based at least in part on the request for authorization; and transmitting, by the account server to the application of the user device, the information for user devices to retrieve portions of the data directly from the service provider based at least in part on the determination that the application of the user device is attempting to access the second data subset of the order information from the service provider.

18. The one or more non-transitory computer-readable storage media of claim 11, wherein the registration request includes information for user devices to retrieve portions of the data directly from the service provider, wherein the request for authorization includes information for identifying the service provider, wherein the computer executable instructions, when executed by the one or more processors, further cause the one or more processors to:

determine that the application of the user device is attempting to access the second data subset of the order information from the service provider based at least in part on the request for authorization; and transmit, to the application of the user device, the information for user devices to retrieve portions of the data directly from the service provider based at least in part on the determination that the application of the user device is attempting to access the second data subset of the order information from the service provider.

19. The method of claim 1, further comprising:

identifying, by the account server, service provider information that uniquely identifies the service provider in the registration request; and determining, by the account server, that the service provider is a reliable service provider based at least in part on the service provider information, wherein the authorization token validation information is provided to the service provider based at least in part on the determination that the service provider is a reliable service provider.

20. The device of claim 15, wherein the one or more processors are further to:

identify service provider information that uniquely identifies the service provider in the registration request; and determine that the service provider is a reliable service provider based at least in part on the service provider information, wherein the authorization token validation information is provided to the service provider based at least in part on the determination that the service provider is a reliable service provider.

* * * * *